US009531890B2

(12) United States Patent
Sato et al.

(10) Patent No.: US 9,531,890 B2
(45) Date of Patent: Dec. 27, 2016

(54) COMMUNICATION DEVICE, IMAGING SYSTEM, AND SERVER

(71) Applicant: Olympus Corporation, Hachioji-shi, Tokyo (JP)

(72) Inventors: Akinobu Sato, Hachioji (JP); Kensuke Ishii, Tokyo (JP); Keito Fukushima, Mitaka (JP); Arata Shinozaki, Hachioji (JP); Yoshihiro Yokomae, Higashiyamoto (JP); Yoshitaka Sato, Musashino (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/632,162

(22) Filed: Feb. 26, 2015

(65) Prior Publication Data

US 2015/0249753 A1 Sep. 3, 2015

(30) Foreign Application Priority Data

Feb. 28, 2014 (JP) ................................ 2014-039304

(51) Int. Cl.
*H04N 1/00* (2006.01)
*H04N 1/32* (2006.01)

(52) U.S. Cl.
CPC ...... *H04N 1/00244* (2013.01); *H04N 1/32641* (2013.01); *H04N 1/32667* (2013.01)

(58) Field of Classification Search
CPC ............ H04N 5/23206; H04N 1/00244; H04N 21/4147; H04W 48/18
See application file for complete search history.

(56) References Cited

U.S. PATENT DOCUMENTS

2005/0015808 A1* 1/2005 Nakamura .............. H04L 29/06 725/105
2011/0050925 A1* 3/2011 Watanabe .......... H04N 5/23203 348/211.2
2013/0120591 A1* 5/2013 Bednarczyk .......... H04W 48/18 348/207.1

FOREIGN PATENT DOCUMENTS

JP 2003-250079 9/2003

* cited by examiner

*Primary Examiner* — Ahmed A Berhan
(74) *Attorney, Agent, or Firm* — John C. Pokotylo; Straub & Pokotylo

(57) ABSTRACT

A communication device includes: a first communication unit that performs at least communications of image data with a first external device in a first communication mode; a second communication unit that performs communications with a second external device via a network in a second communication mode; a communication status determination unit that determines communication status in the first communication mode; and a device-side communication controller. When the communication status in the first communication mode is not favorable for communications of the image data, the device-side communication controller performs communications with the second external device via the second communication unit on a request for turning the communication status in the first communication mode to favorable status.

8 Claims, 15 Drawing Sheets

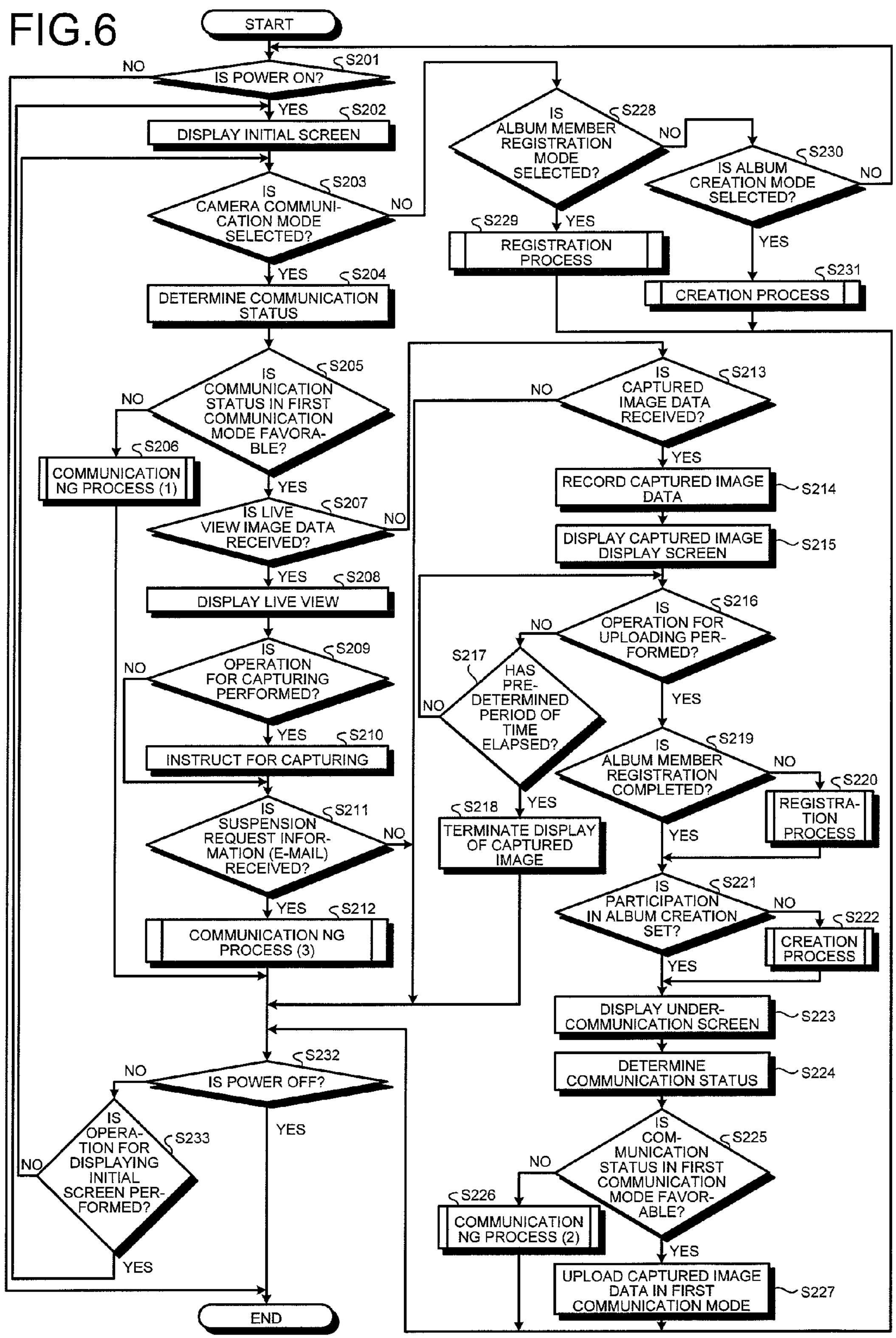
FIG.6
START
S201
IS POWER ON?
NO
YES
S202
DISPLAY INITIAL SCREEN
S203
IS CAMERA COMMUNI-CATION MODE SELECTED?
NO
YES
S204
DETERMINE COMMUNICATION STATUS
S205
IS COMMUNICATION STATUS IN FIRST COMMUNICATION MODE FAVORA-BLE?
NO
S206
COMMUNICATION NG PROCESS (1)
YES
S207
IS LIVE VIEW IMAGE DATA RECEIVED?
NO
YES
S208
DISPLAY LIVE VIEW
S209
IS OPERATION FOR CAPTURING PERFORMED?
NO
YES
S210
INSTRUCT FOR CAPTURING
S211
IS SUSPENSION REQUEST INFOR-MATION (E-MAIL) RECEIVED?
NO
YES
S212
COMMUNICATION NG PROCESS (3)
S228
IS ALBUM MEMBER REGISTRATION MODE SELECTED?
NO
YES
S229
REGISTRATION PROCESS
S230
IS ALBUM CREATION MODE SELECTED?
NO
YES
S231
CREATION PROCESS
S213
IS CAPTURED IMAGE DATA RECEIVED?
NO
YES
S214
RECORD CAPTURED IMAGE DATA
S215
DISPLAY CAPTURED IMAGE DISPLAY SCREEN
S216
IS OPERATION FOR UPLOADING PER-FORMED?
NO
S217
HAS PRE-DETERMINED PERIOD OF TIME ELAPSED?
NO
YES
S218
TERMINATE DISPLAY OF CAPTURED IMAGE
YES
S219
IS ALBUM MEMBER REGISTRATION COMPLETED?
NO
S220
REGISTRA-TION PROCESS
YES
S221
IS PARTICIPATION IN ALBUM CREATION SET?
NO
S222
CREATION PROCESS
YES
S223
DISPLAY UNDER-COMMUNICATION SCREEN
S224
DETERMINE COMMUNICATION STATUS
S225
IS COM-MUNICATION STATUS IN FIRST COMMUNICATION MODE FAVOR-ABLE?
NO
S226
COMMUNICATION NG PROCESS (2)
YES
S227
UPLOAD CAPTURED IMAGE DATA IN FIRST COMMUNICATION MODE
S232
IS POWER OFF?
NO
YES
S233
IS OPERA-TION FOR DISPLAYING INITIAL SCREEN PER-FORMED?
NO
YES
END

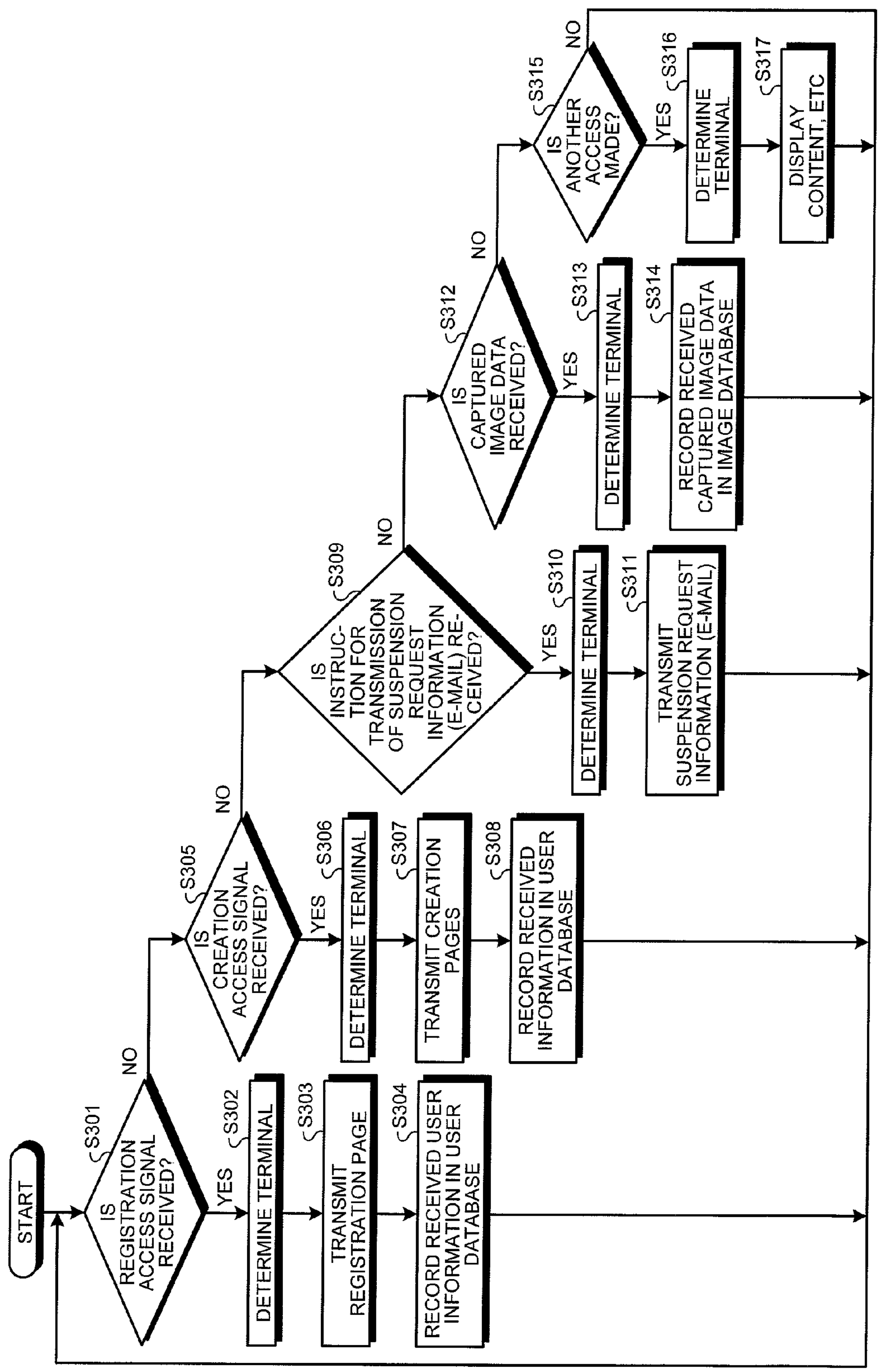
FIG.24
START
IS REGISTRATION ACCESS SIGNAL RECEIVED?
S301
YES
NO
DETERMINE TERMINAL
S302
TRANSMIT REGISTRATION PAGE
S303
RECORD RECEIVED USER INFORMATION IN USER DATABASE
S304
IS CREATION ACCESS SIGNAL RECEIVED?
S305
DETERMINE TERMINAL
S306
TRANSMIT CREATION PAGES
S307
RECORD RECEIVED INFORMATION IN USER DATABASE
S308
IS INSTRUCTION FOR TRANSMISSION OF SUSPENSION REQUEST INFORMATION (E-MAIL) RECEIVED?
S309
DETERMINE TERMINAL
S310
TRANSMIT SUSPENSION REQUEST INFORMATION (E-MAIL)
S311
IS CAPTURED IMAGE DATA RECEIVED?
S312
DETERMINE TERMINAL
S313
RECORD RECEIVED CAPTURED IMAGE DATA IN IMAGE DATABASE
S314
IS ANOTHER ACCESS MADE?
S315
DETERMINE TERMINAL
S316
DISPLAY CONTENT, ETC
S317

COMMUNICATION DEVICE, IMAGING SYSTEM, AND SERVER

CROSS-REFERENCE TO RELATED APPLICATIONS

This application is based upon and claims the benefit of priority from Japanese Patent Application No. 2014-039304, filed on Feb. 28, 2014, the entire contents of which are incorporated herein by reference.

BACKGROUND OF THE INVENTION

1. Field of the Invention

The present invention relates to a communication device, an imaging system, and a server.

2. Description of the Related Art

In recent years, there has been known a technique for an imaging apparatus such as a digital camera to generate image data by imaging and transmit the image data in sequence using a communication technology to an external communication device such as a mobile phone (for example, refer to Japanese Laid-open Patent Publication No. 2003-250079).

This technique is intended to remotely operate the imaging apparatus by the communication device.

Specifically, according to this technique, the communication device receives image data in sequence from the imaging apparatus, and displays live view images corresponding to the image data in sequence on a display unit provided therein. The user of the communication device executes a capturing operation on the communication device at the timing at which the imaging apparatus is to execute capturing, while watching the live view images displayed on the display unit of the communication device. By the capturing operation, a capturing instruction is transmitted from the communication device to the imaging apparatus. Upon receipt of the capturing instruction, the imaging apparatus captures an image of a subject and generates image data, and transmits the image data to the communication device.

SUMMARY OF THE INVENTION

In accordance with some embodiments, a communication device, an imaging system, and a server are presented.

In some embodiments, a communication device includes: a first communication unit that performs at least communications of image data with a first external device in a first communication mode; a second communication unit that performs communications with a second external device via a network in a second communication mode different from the first communication mode; a communication status determination unit that determines whether or not communication status in the first communication mode is favorable for communications of the image data; and a device-side communication controller that controls operations of the first communication unit and the second communication unit. When the communication status determination unit determines that the communication status in the first communication mode is not favorable for communications of the image data, the device-side communication controller performs communications with the second external device via the second communication unit on a request for turning the communication status in the first communication mode to favorable status.

In some embodiments, an imaging system includes a communication device communicable in two communication modes and an imaging apparatus performing communications in a first communication mode of the two communication modes. The communication device is connectable to an external server via a network in a second communication mode different from the first communication mode of the two communication modes, and when communication status in the first communication mode is not favorable for communications of image data, the communication device connects to the server in the second communication mode and performs communications with the server on a request for suspension of communications performed by other communication devices in the first communication mode. The imaging apparatus includes an imaging unit that captures a subject to generate image data, an imaging-side recording unit that records location information indicative of a location of the server on the network, an imaging-side communication unit that connects to the communication device to transmit and receive information to and from the communication device in the first communication mode, and an imaging-side communication controller that transmits the image data and the location information to the communication device via the imaging-side communication unit.

In some embodiments, a server configured to communicate with a plurality of communication devices via a network is presented. The server includes: a server-side communication unit that connects to the plurality of communication devices via the network to transmit and receive information to and from the plurality of communication devices; a server-side recording unit that records each of address information indicative of an address at which information is transmitted to each of the plurality of communication device, each of the address information being set for each of the plurality of communication devices; and a server-side communication controller that receives from one of the plurality of communication devices via the server-side communication unit, a request for suspension of communications performed by the other communication devices except for the one communication device in the first communication mode. When the server-side communication controller receives the request for suspension, the server-side communication controller transmits suspension request information to at least one of the other communication devices with the address information recorded in the server-side recording unit.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a flowchart of operations of the communication device illustrated in FIG. 1 and FIG. 2;

FIG. 24 is a flowchart of operations of the server illustrated in FIG. 1 and FIG. 3.

DETAILED DESCRIPTION OF THE PREFERRED EMBODIMENTS

Figure 1:
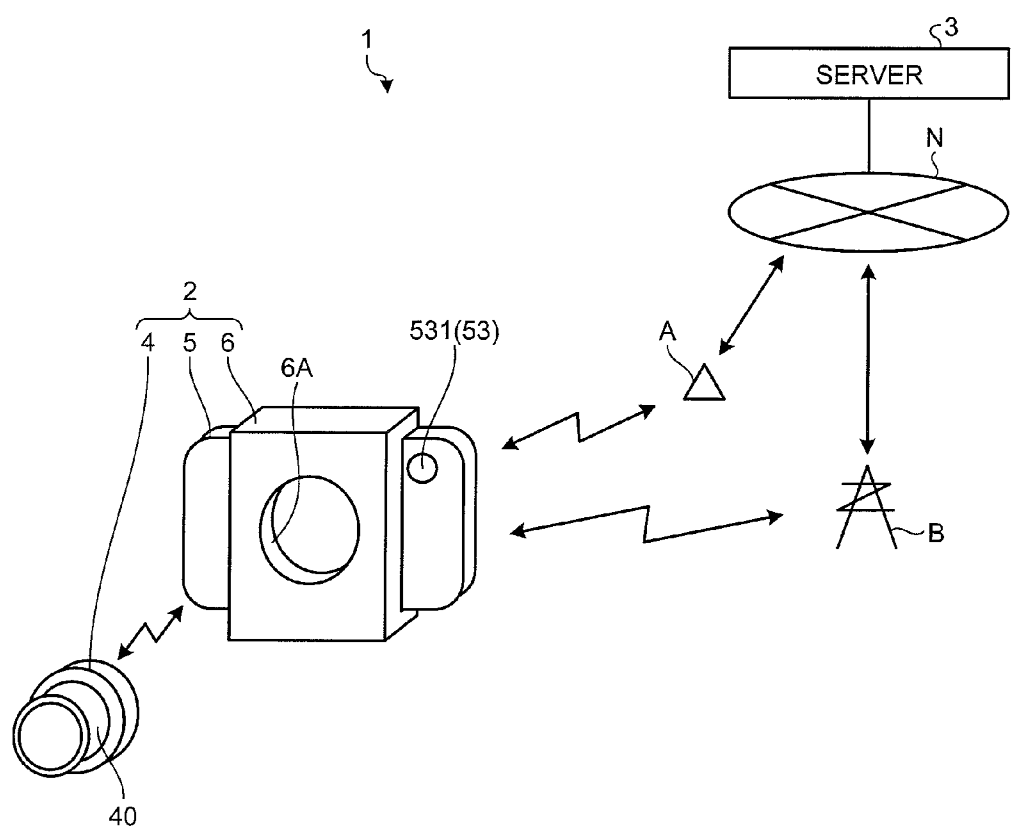
FIG. 1 is a schematic view of a configuration of a communication system according to an embodiment of the present invention.

An embodiment for carrying out the present invention (hereinafter, referred to as embodiment) will be described below with reference to the accompanying drawings. However, the present invention is not limited to the embodiment described below. In all the drawings, the same components are given the same reference numerals.

Configuration of a Communication System

FIG. 1 is a schematic view of a configuration of a communication system 1 according to an embodiment of the present invention.

The communication system 1 is used by a plurality of camera users with the common aim of capturing one and the same subject, and is intended to manage a plurality of images captured by the plurality of camera users in one album. The communication system 1 includes: a camera system 2 that has an imaging apparatus 4 that captures an image of a subject and a communication device 5 that is communicable in two communication modes; and a server 3 that is accessible by the communication device 5 via an internet network (network) N in the two communication modes.

Although the communication system 1 is configured to include a plurality of camera systems 2, FIG. 1 illustrates only one camera system 2 for the sake of description.

Configuration of the Camera System

Figure 2:
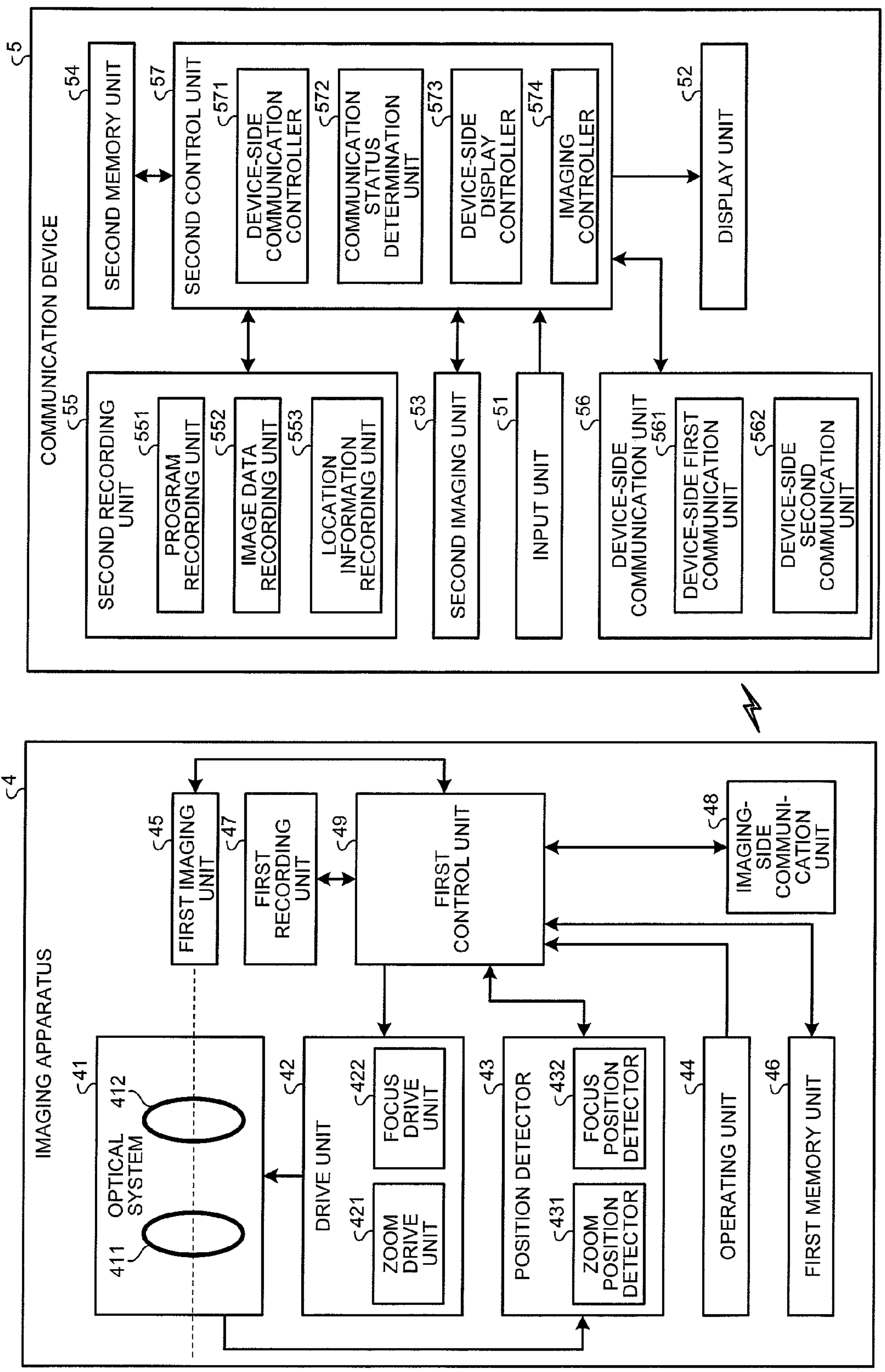
FIG. 2 is a block diagram of a configuration of a camera system illustrated in FIG. 1.

FIG. 2 is a block diagram of a configuration of the camera system 2.

The camera system 2 has the functions of an imaging system according to the present invention, and includes an attachment 6 (refer to FIG. 1) as well as the imaging apparatus 4 and the communication device 5, as illustrated in FIG. 1 or 2.

The attachment 6 is a member that connects mechanically the imaging apparatus 4 and the communication device 5.

More specifically, the attachment 6 is attached to the back surface of the communication device 5 as illustrated in FIG. 1. In addition, the attachment 6 is formed in the shape of a circular column in a plane view and has an attachment hole 6A into which the imaging apparatus 4 is to be fitted.

When the imaging apparatus 4 and the communication device 5 are mechanically connected via the attachment 6, the entire shape of the camera system 2 is seen like a digital camera.

The camera system 2 is not limited to the configuration with the attachment 6 but may be configured without the attachment 6.

Configuration of the Imaging Apparatus

Hereinafter, a configuration of the imaging apparatus 4 will be mainly described as a major component of the present invention.

The imaging apparatus 4 includes an optical system 41, a drive unit 42, a position detector 43, an operating unit 44, a first imaging unit 45, a first memory unit 46, a first recording unit 47, an imaging-side communication unit 48, and a first control unit 49, as illustrated in FIG. 2. These members 41 to 49 are stored in a lens mirror barrel 40 (refer to FIG. 1) formed in the entire shape of an almost circular cylinder. That is, the entire shape of the imaging apparatus 4 is almost the same as that of a so-called replacement lens as illustrated in FIG. 1.

The optical system 41 collects light from a predetermined viewing field and forms an image of the collected light on an imaging surface of an imaging element (not illustrated) constituting the first imaging unit 45. The optical system 41 includes a zoom lens 411 and a focus lens 412 as illustrated in FIG. 2.

The zoom lens 411 is composed of one or more lenses and moves along an optical axis indicated by a dashed line in FIG. 2 to change the zoom factor of the optical system 41.

The focus lens 412 is composed of one or more lenses and moves along the optical axis indicated by the dashed line in FIG. 2 to change the focus position and the focus distance of the optical system 41.

The drive unit 42 moves the lenses 411 and 412 constituting the optical system 41 along the optical axis under control of the first control unit 49. The drive unit 42 includes a zoom drive unit 421 and a focus drive unit 422 as illustrated in FIG. 2.

The zoom drive unit 421 is composed of a stepping motor, a DC motor, or the like, and moves the zoom lens 411 along the optical axis.

The focus drive unit 422 is composed of a stepping motor, a DC motor, or the like, and moves the focus lens 412 along the optical axis.

The position detector 43 detects the positions of the lenses 411 and 412 constituting the optical system 41 on the optical axis. The position detector 43 includes a zoom position detector 431 and a focus position detector 432 as illustrated in FIG. 2.

The zoom position detector 431 is composed of a photointerrupter or the like, and detects the position of the zoom lens 411 driven by the zoom drive unit 421 on the optical axis.

Specifically, the zoom position detector 431 converts the amount of rotation of a driving motor included in the zoom drive unit 421 into the number of pulses, and based on the converted number of pulses, detects the position of the zoom lens 411 on the optical axis from a reference position with reference to infinity.

The focus position detector 432 is composed of a photointerrupter or the like, and detects the position of the focus lens 412 driven by the focus drive unit 422 on the optical axis in the same manner as with the zoom position detector 431.

The operating unit 44 constitutes an operation ring on the circumference of the lens mirror barrel 40, buttons and switches on the outer surface of the lens mirror barrel 40, and the like, and is configured to receive a user operation such as an operation for changing the positions of the zoom lens 411 and the focus lens 412 in the optical system 41 on the optical axis or an operation for capturing. Then, the operating unit 44 outputs to the first control unit 49 an instructive signal according to the user operation.

The first imaging unit 45 has the functions of an imaging unit according to the present invention and is configured to shoot an image of a subject and generate image data under control of the first control unit 49. The first imaging unit 45 is composed of an imaging element such as a CCD (charge coupled device) that receives the image of the subject formed by the optical system 41 and converts the same into an electric signal, and a signal processing unit that performs signal processing (A/D conversion or the like) on the electric signal (analog signal) from the imaging element to generate digital image data. Then, the image data generated in sequence by the first imaging unit 45 (hereinafter, referred to as live view image data) is associated with time information related to the time at which the live view image data was generated (hereinafter, referred to as time stamps) under control of the first control unit 49, and then is stored in sequence in the first memory unit 46. In addition, the image data generated by the first imaging unit 45 according to the camera user's operation for capturing on the imaging apparatus 4 (the operating unit 44) or the communication device 5 (hereinafter, referred to as captured image data) is associated with time stamps related to the time at which the captured image data was generated, and then is stored in the first recording unit 47.

The first memory unit 46 stores in sequence the live view image data (including the time stamps) generated by the first imaging unit 45.

The first recording unit 47 records various programs to be executed by the first control unit 49, characteristic information related to the characteristics of the optical system 41 such as the scale factor, focus distance, angle of view, aberration, and F value (brightness) of the optical system 41, and location information (URL (Uniform Resource Locator)) indicative of the location of the server 3 on the internet network N. That is, the first recording unit 47 has the functions of an imaging-side recording unit according to the present invention. The first recording unit 47 also records the captured image data (including the time stamps) generated by the first imaging unit 45 under control of the first control unit 49, according to the camera user's operation for capturing on the imaging apparatus 4 (the operating unit 44) or the communication device 5.

The imaging-side communication unit 48 is a communication interface for performing wireless communications of various data including signals required for communications with the communication device 5 in a first communication mode, under control of the first control unit 49.

In the embodiment, the first communication mode is Wi-Fi (Wireless Fidelity) (registered trademark). However, the first communication mode may be any other communication mode such as WiMAX (Worldwide Interoperability for Microwave Access) (registered trademark) in place of Wi-Fi as far as the communication mode uses a wireless LAN (local area network).

For example, in the case of using Wi-Fi (registered trademark), it is assumed that, in a local area network, devices are in access point-to-station relationship, and connection processing is generally performed such that the stations connect to a wireless network built by the access points.

The broad sequence of the connection processing is as follows: (step 1) each of the access points builds up a wireless network and sends its own network identifier (SSID); (step 2) each of the stations searches the notified network identifiers (SSID) and connects to a desired network (access point). Since the steps 1 and 2 are performed over networks with a large number of devices for a wide coverage, strict identification needs to be made taking interference problems into account. This may take time to establish a connection. However, in data communications, data can be transmitted and received between the access points and the stations at their respective timings. In this example, the imaging apparatus 4 is considered as an access point and the communication device 5 as a station. The access point-to-station relationship may be reversed. Since the communication is enabled at a speed of 10 megabits/second or higher, the image data stored (recorded) in the first memory unit 46 or the first recording unit 47 can be transmitted at high speeds. At that time, the communication device 5 can view the image data recorded in the first recording unit 47 of the imaging apparatus 4 in a browser.

In addition, the Wi-Fi (registered trademark) communications are performed between the communication device 5 and the imaging apparatus 4 and between the communication device 5 and an access point A illustrated in FIG. 1, for example.

The first control unit 49 is composed of a CPU (central processing unit) or the like, and controls operations of the entire imaging apparatus 4 according to an instructive signal from the operating unit 44 or an instructive signal input from the communication device 5 via the imaging-side communication unit 48.

For example, the first control unit 49 establishes a communication connection with the communication device 5 via the imaging-side communication unit 48 in the first communication mode such as Wi-Fi (registered trademark). Then, the first control unit 49 transmits to the communication device 5 the characteristic information and the location information recorded in the first recording unit 47, position information on the positions of the zoom lens 411 and the focus lens 412 detected by the position detector 43, the latest live view image data (including the time stamps) recorded in the first memory unit 46, the latest captured image data (including the time stamps) recorded in the first recording unit 47, and the like. That is, the first control unit 49 has the functions of an imaging-side communication controller according to the present invention. The foregoing term "latest" refers to newest in the time series according to the time stamps (this also applies to the subsequent descriptions). In addition, the first control unit 49 receives an instruction for capturing or an instruction for operating the optical system 41 from the communication device 5 via the imaging-side communication unit 48.

Configuration of the Communication Device

The communication device 5 is configured as a digital camera, a digital video camera, a mobile phone, a tablet-type mobile device, or the like, for example (the communication device 5 is illustrated as a mobile phone (smart phone) in FIG. 1).

Hereinafter, a configuration of the communication device 5 will be mainly described as a major component of the present invention.

The communication device 5 includes an input unit 51, a display unit 52, a second imaging unit 53, a second memory unit 54, a second recording unit 55, a device-side communication unit 56, and a second control unit 57, as illustrated in FIG. 2.

The input unit 51 is composed of buttons, switches, touch panel and the like that accept user operations, and outputs an instructive signal according to the user operation to the second control unit 57.

The display unit 52 is composed of a display panel formed from a liquid crystal or organic EL (electro luminescence) or the like, and displays a predetermined image under control of the second control unit 57.

The second imaging unit 53 is provided on the back surface of the communication device 5 (refer to FIG. 1), and captures an image of a subject and generates image data under control of the second control unit 57. The second imaging unit 53 is composed of an optical system 531 (refer to FIG. 1) that forms an image of a subject, an imaging element (not illustrated) such as a CCD that receives the image of the subject formed by the optical system 531 and converts the same into an electric signal, a signal processing unit that performs signal processing (A/D conversion or the like) on the electric signal (analog signal) from the imaging element to generate digital image data, and the like.

The second memory unit 54 stores the image data generated by the second imaging unit 53 and the information received from the imaging apparatus 4 via the device-side communication unit 56.

The second recording unit 55 includes a program recording unit 551, an image data recording unit 552, and a location information recording unit 553, as illustrated in FIG. 2.

The program recording unit 551 records various programs (including communication programs) to be executed by the second control unit 57, various data for use during execution of the programs, and the like.

The image data recording unit 552 records captured image data generated by the imaging apparatus 4 or image data generated by the second imaging unit 53 according to the camera user's operation for capturing on the input unit 51 under control of the second control unit 57.

The location information recording unit 553 records location information (URL) received from the imaging apparatus 4 via the device-side communication unit 56 under control of the second control unit 57.

The device-side communication unit 56 performs wireless communications of various data including signals required for communications with the imaging apparatus 4 or the server 3 under control of the second control unit 57, according to a predetermined protocol. The device-side communication unit 56 includes a device-side first communication unit 561 and a device-side second communication unit 562, as illustrated in FIG. 2.

The device-side first communication unit 561 is a communication interface for performing communications in the first communication mode using a wireless LAN such as Wi-Fi (registered trademark), and has the functions of a first communication unit according to the present invention.

The device-side second communication unit 562 is a communication interface for performing communications in the second communication mode that is different from the first communication mode and uses a mobile phone line such as 3G or 4G, and has the functions of a second communication unit according to the present invention.

The communications using 3G or 4G are performed between the communication device 5 and a base station B and between the communication device 5 and the server 3 via the internet network N, as illustrated in FIG. 1, for example.

The second control unit 57 is composed of a CPU or the like, and controls entire operations of the communication device 5 by providing corresponding instructions to the components of the communication device 5 or transmitting data to the same according to instructive signals and the like from the input unit 51. The second control unit 57 includes a device-side communication controller 571, a communication status determination unit 572, a device-side display controller 573, and an imaging controller 574, as illustrated in FIG. 2.

The device-side communication controller 571 acquires the SSID of the imaging apparatus 4 via the device-side first communication unit 561 and establishes a communication connection in the first communication mode such as Wi-Fi (registered trademark). Then, the device-side communication controller 571 receives from the imaging apparatus 4 characteristic information, position information, live view image data (including the time stamps), captured image data (including the time stamps), and location information (URL) and the like. In addition, the device-side communication controller 571 connects to the internet network N via the device-side first communication unit 561 or the device-side second communication unit 562. Specifically, the device-side communication controller 571 connects to the internet network N via the external access point A in the first communication mode such as Wi-Fi (registered trademark) (the device-side first communication unit 561), as illustrated in FIG. 1. In addition, the device-side communication controller 571 connects to the internet network N via the external base station B in the second communication mode such as 3G (the device-side second communication unit 562). Then, the device-side communication controller 571 can access the server 3 connected to the internet network N according to the location information (URL) received from the imaging apparatus 4. Further, when the communication status determination unit 572 determines that the communication status in the first communication mode such as Wi-Fi (registered trademark) is not favorable for communications of image data, the device-side communication controller 571 accesses the server 3 in the second communication mode such as 3G to instruct the server 3 to transmit suspension request information. The suspension request information here refers to information indicative of a request for suspension of communications in the first communication mode such as Wi-Fi (registered trademark) to other communication devices 5. That is, in the embodiment, the communication device 5 (the device-side communication controller 571) transmits the information on the request for suspension, according to e-mail addresses or identification information for the other communication devices 5 recorded in the server 3.

In the embodiment, the request for suspension of communications is transmitted. Alternatively, any other request for securing a communication bandwidth by performing intermittent communications with other devices, reducing the amount of communication data, or lowering the frame rate may be transmitted to change the status of communications with the other devices so that the device-side communication controller 571 can communicate the image data in a favorable status.

The communication status determination unit 572 determines whether the communication status in the first communication mode such as Wi-Fi (registered trademark) is favorable for communications of image data.

For example, the communication status determination unit 572 detects a throughput indicative of a signal band of a signal (when the first communication mode is Wi-Fi (registered trademark), a signal of Wi-Fi (registered trademark)) transmitted from the imaging apparatus 4 or the access point A in the first communication mode. Then, when the throughput is equal to or more than a predetermined value, the communication status determination unit 572 determines that the communication status in the first communication mode is favorable for communications of image data. On the other hand, when the throughput is less than the predetermined value, the communication status determination unit 572 determines that the communication status in the first communication mode is not favorable for communications of image data.

The device-side display controller 573 controls operations of the display unit 52 to display on the display unit 52 live view images corresponding to the live view image data stored in the second memory unit 54, images corresponding to the image data such as captured image data recorded in the image data recording unit 552, an initial screen for prompting selection of various modes, and the like.

In addition, the device-side display controller 573 and the display unit 52 described above have the functions of a notification unit according to the present invention.

When the communication device 5 is set in a camera communication mode (for capturing an image of a subject by the imaging apparatus 4), the imaging controller 574 transmits to the imaging apparatus 4 an instruction for capturing (including a request for transmission of captured image data obtained by the capturing) via the device-side first communication unit 561 according to the camera user's operation for capturing on the input unit 51. Then, when the captured image data is transferred from the imaging apparatus 4, the imaging controller 574 records the captured image data in the image data recording unit 552. In addition, the imaging controller 574 transmits to the imaging apparatus 4 an instruction for operating the optical system 41 via the device-side first communication unit 561, according to the camera user's operation for operating the optical system 41 (changing the positions of the zoom lens 411 and the focus lens 412 on the optical axis) on the input unit 51.

Meanwhile, when the communication device 5 is in a normal shooting mode (for capturing an image of a subject by the second imaging unit 53), the imaging controller 574 causes the second imaging unit 53 to capture an image of the subject according to the operation for capturing on the input unit 51 by the user of the communication device 5, and records the image data generated by the second imaging unit 53 in the image data recording unit 552.

Configuration of the Server

The server 3 is configured to manage a plurality of images captured by a plurality of camera users with the common capturing aim, in one album (when there is a plurality of groups of camera users, the server 3 manages an album for each of the groups). The server 3 also controls provision of communication-related information to at least the communication devices 5 undergoing imaging control among the communication devices 5 accessing the server 3.

Hereinafter, a configuration of the server 3 will be mainly described as a major component of the present invention.

Figure 3:
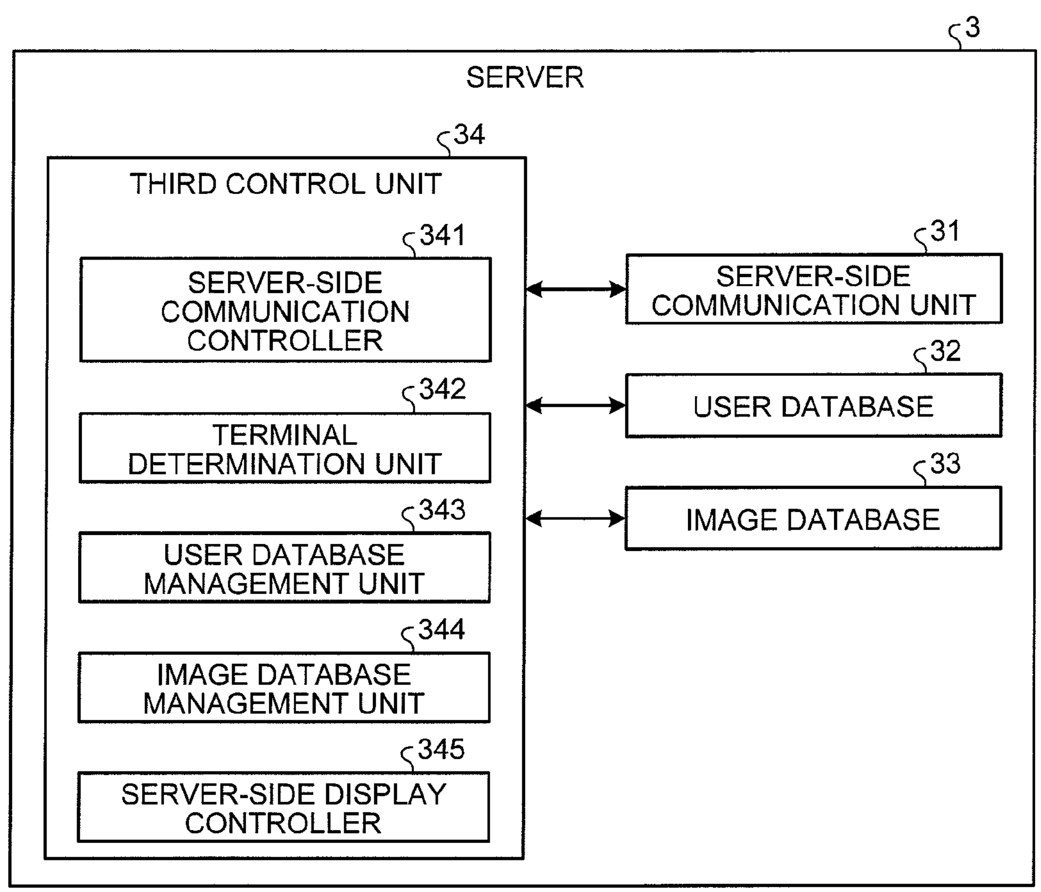
FIG. 3 is a block diagram of a configuration of a server illustrated in FIG. 1.

FIG. 3 is a block diagram of a configuration of the server 3.

The server 3 includes a server-side communication unit 31, a user database 32, an image database 33, and a third control unit 34, as illustrated in FIG. 3.

The server-side communication unit 31 is a communication interface for performing wireless communications of various data including signals required for communications with the communication devices 5 via the internet network N, in a predetermined communication mode, under control of the third control unit 34.

The user database 32 records user information for camera users such as handle names of the camera users, identification information or e-mail addresses (equivalent to address information according to the present invention) for identifying the terminals of the communication devices 5 used by the camera users, and the like, under control of the third control unit 34. That is, the user database 32 has the functions of a server-side recording unit according to the present invention. The user information here is associated by the third control unit 34 with the identification information for the terminals of the communication devices 5 used by the camera users corresponding to the user information and information on the names of albums that are to be created with the participation of the camera users corresponding to the user information.

The image database 33 records the captured image data received from the communication devices 5 via the server-side communication unit 31 under control of the third control unit 34. The captured image data here is associated by the third control unit 34 with the information on the names of the albums that are to be created with the participation of the camera users of the communication devices 5 having transmitted the captured image data.

The third control unit 34 is composed of a CPU or the like, and is configured to control entire operations of the server 3. The third control unit 34 includes a server-side communication controller 341, a terminal determination unit 342, a user database management unit 343, an image database management unit 344, and a server-side display controller 345, as illustrated in FIG. 3.

The server-side communication controller 341 controls operations of the server-side communication unit 31 according to an access signal (including the identification information for the terminal of the communication device 5 as a transmission source) transmitted from the communication device 5 via the internet network N, thereby establishing a communication connection with the communication device 5. In addition, upon receipt of an instruction for transmission of suspension request information (e-mail) (including the identification information for the terminal of the communication device 5 as a transmission source) from the communication device 5 via the server-side communication unit 31, the server-side communication controller 341 refers to the information stored in the user database 32 and transmits the suspension request information (e-mail) to communication devices 5 other than the communication device 5 specified by the terminal determination unit 342.

The terminal determination unit 342 determines (specifies) the identification information for the communication device 5 as a transmission source having made access, according to the access signal transmitted from the communication device 5 via the internet network N.

The user database management unit 343 manages the user database 32.

Specifically, when the camera user of the communication device 5 sets (enters) user information on a registration page displayed at the communication device 5 in the browser of the communication device 5, the user database management unit 343 records in the user database 32 the user information in association with the identification information for the communication device 5 with the user information specified by the terminal determination unit 342. The user database management unit 343 also associates information related to the name of an album set by the camera user of the communication device 5 to participate in the creation of the album on the creation page displayed at the communication device 5 in the browser of the communication device 5 and the validity period of the album creation (hereinafter, referred to as album validity period), with the user information stored in the user database 32 and corresponding to the identification information for the communication device 5 specified by the terminal determination unit 342.

That is, the user database management unit 343 records a plurality of pieces of user information, identification information, and information on the names of the albums to be created with the participation of the users and the album validity periods, which are associated with one another.

The image database management unit 344 manages the image database 33.

Specifically, upon receipt of captured image data from the communication device 5 via the server-side communication unit 31, the image database management unit 344 records the captured image data in the image database 33. In this case, the image database management unit 344 associates the information related to the name of the album associated with the user information recorded in the user database 32 and corresponding to the identification information for the communication device 5 specified by the terminal determination unit 342, with the captured image data.

That is, the image database management unit 344 records a plurality of pieces of captured image data and information related to the names of the albums, which are associated with one another.

The server-side display controller 345 transmits a specified page to the communication device 5 according to the access signal received from the communication device 5 via the server-side communication unit 31, and causes the communication device 5 to display the image corresponding to the specified page.

Operations of the Communication System

Next, operations of the foregoing communication system 1 will be described.

Figure 4:
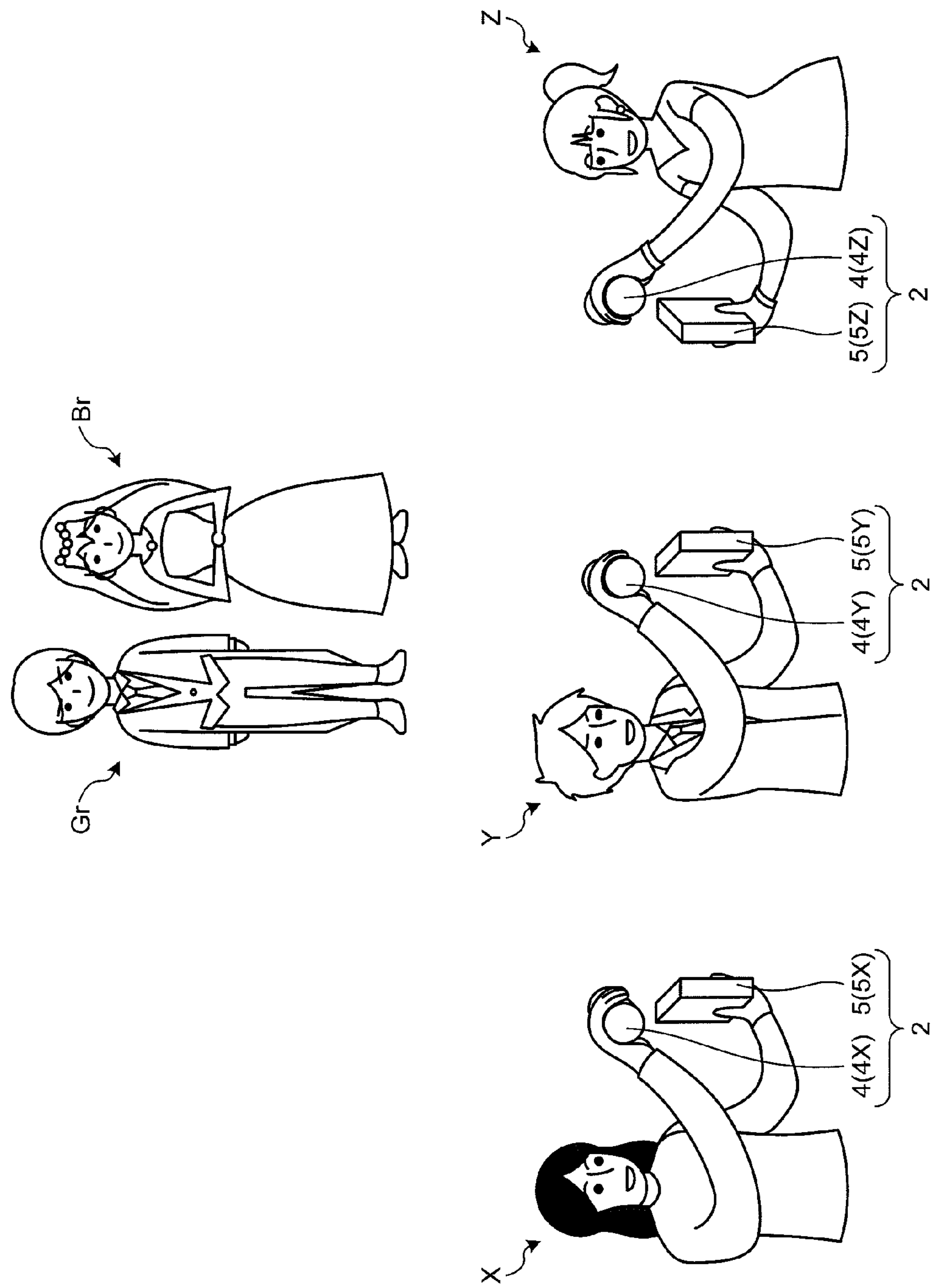
FIG. 4 is a diagram illustrating one example of usage mode of the communication system illustrated in FIG. 1.

FIG. 4 is a diagram illustrating one example of usage mode of the communication system 1. Specifically, FIG. 4 provides a mode in which, at a wedding ceremony, a plurality of camera users as attendees (in the example of FIG. 4, a camera user X (hereinafter, referred to as "X"), a camera user Y (hereinafter, referred to as "Y"), and a camera user Z (hereinafter, referred to as "Z")) use their respective camera systems 2 to capture images of a groom Gr and a bride Br, and the captured images are managed in one album at the server 3. In the example of FIG. 4, the camera systems 2 do not use the attachment 6.

Operations of the imaging apparatus 4, operations of the communication device 5, and operations of the server 3 will be described in sequence as operations of the communication system 1.

It is assumed that communication connection are already established (completed) in the first communication mode such as Wi-Fi (registered trademark) between the imaging apparatuses 4 and the communication devices 5 on a one-to-one basis (between an imaging apparatus 4X used by X and a communication device 5X used by X, between an imaging apparatus 4Y used by Y and a communication device 5Y used by Y, and between an imaging apparatus 4Z used by Z and a communication device 5Z used by Z). Hereinafter, transmission and reception of live view image data, instructions for capturing, and captured image data between the imaging apparatuses 4 and the communication devices 5 will be mainly described. Transmission and reception of characteristic information, position information, instructions for operation will not be described.

Operations of the Imaging Apparatus

Figure 5:
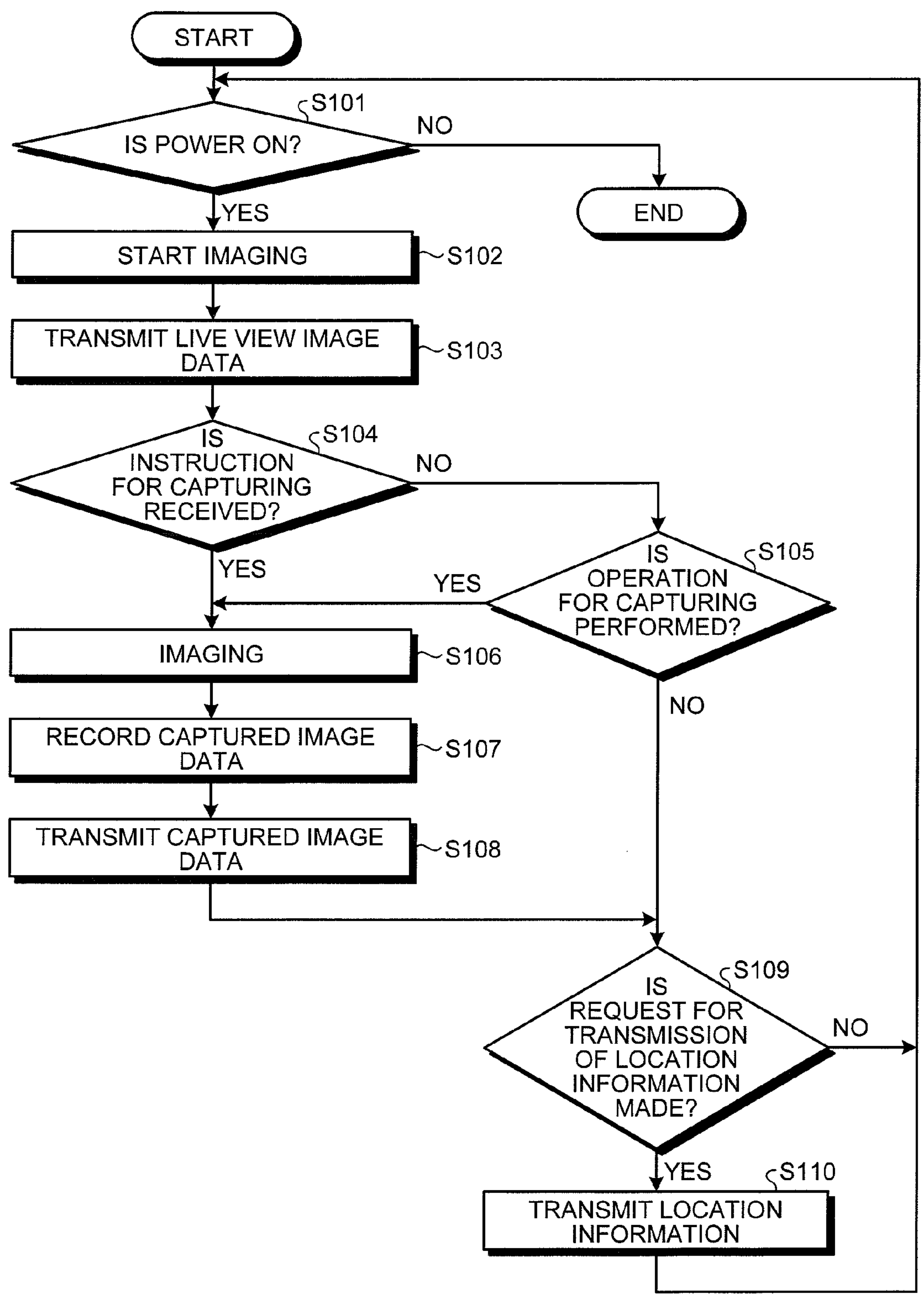
FIG. 5 is a flowchart of operations of an imaging apparatus illustrated in FIG. 1 and FIG. 2.

FIG. 5 is a flowchart of operations of the imaging apparatus 4.

When the imaging apparatus 4 is powered on by the camera user's operation on the operating unit 44 (step S101: Yes), the first control unit 49 causes the first imaging unit 45 to start imaging (step S102). The live view image data (including the time stamps) generated by the first imaging unit 45 is stored in sequence in the first memory unit 46.

Then, the first control unit 49 transmits the latest live view image data (including the time stamps) stored in the first memory unit 46 to the communication device 5 via the imaging-side communication unit 48 (step S103).

Then, the first control unit 49 determines whether an instruction for capturing has been received from the communication device 5 via the imaging-side communication unit 48 (step S104).

When determining that no instruction for capturing has been received (step S104: No), the first control unit 49 then determines whether an operation for capturing has been performed on the operating unit 44 by the camera user (step S105).

When determining that the instruction for capturing has been received (step S104: Yes) or the operation for capturing has been performed (step S105: Yes), the first control unit 49 causes the first imaging unit 45 to perform imaging (step S106).

Subsequently, the first control unit 49 records the captured image data (including the time stamps) generated by the imaging in the first recording unit 47 (step S107).

Then, the first control unit 49 transmits the latest captured image data recorded in the first recording unit 47 to the communication device 5 via the imaging-side communication unit 48 (step S108).

After step S108 or when determining that no operation for capturing has been performed (step S105: No), the first control unit 49 then determines whether a request for transmission of location information (URL) has been received from the communication device 5 via the imaging-side communication unit 48 (step S109).

When determining that no request for transmission of the location information has been received (step S109: No), the imaging apparatus 4 returns the process to step S101.

On the other hand, when determining that the request for transmission of location information has been received (step S109: Yes), the first control unit 49 transmits the location information recorded in the first recording unit 47 to the communication device 5 via the imaging-side communication unit 48 (step S110). After that, the imaging apparatus 4 returns the process to step S101.

Operations of the Communication Device

Next, operations of the communication device 5 (communication method according to the invention) will be described.

FIG. 6 is a flowchart of operations of the communication device 5.

When the communication device 5 is powered on by the camera user's operation on the input unit 51 (step S201: Yes), the device-side display controller 573 causes the display unit 52 to display an initial screen for prompting selection from among various modes (step S202).

Figure 7:
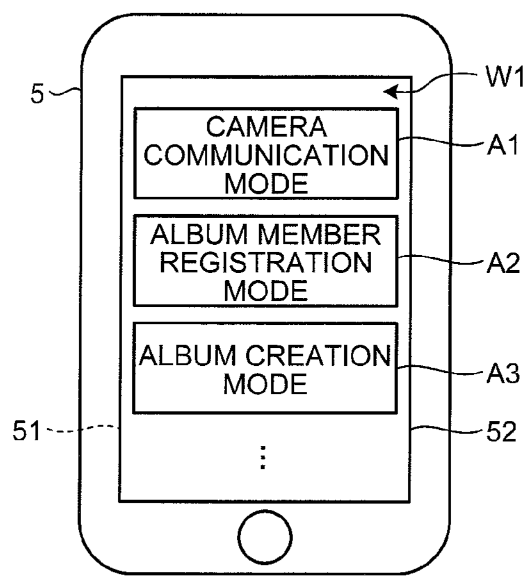
FIG. 7 is a diagram illustrating one example of an initial screen displayed at step S202 described in FIG. 6.

FIG. 7 is a diagram illustrating one example of an initial screen W1 displayed at step S202.

For example, the device-side display controller 573 causes the display unit 52 to display the initial screen W1 illustrated in FIG. 7 at step S202.

The initial screen W1 as illustrated in FIG. 7 includes an operation icon A1 for accepting an operation for selection of "camera communication mode," an operation icon A2 for accepting an operation for selection of "album member registration mode," and an operation icon A3 for accepting an operation for selection of "album creation mode," and the like.

In this example, the "album member registration mode" is a mode for registering user information required for creation of an album with the server 3 (user registration). The "album creation mode" is a mode for participating in the creation of an album managed by the server 3.

Then, the second control unit 57 determines whether the "camera communication mode" has been selected by the camera user's operation on the input unit 51 (in the example of FIG. 7, whether the operation icon A1 has been touched by the camera user's operation on a touch panel (the input unit 51) (step S203).

When the "camera communication mode" has been selected (step S203: Yes), the communication status determination unit 572 then determines whether the communication status in the first communication mode such as Wi-Fi (registered trademark) is favorable for communications of image data (step S204: determination step).

When determining that the communication status in the first communication mode is not favorable (step S205: No), the second control unit 57 executes a communication NG process (1) (step S206). After that, the communication device 5 moves the process to step S232.

The communication NG process (1) (step S206) will be described later in detail.

On the other hand, when determining that the communication status in the first communication mode is favorable (step S205: Yes), the device-side communication controller 571 then determines whether live view image data (including the time stamps) has been received from the imaging apparatus 4 via the device-side first communication unit 561 (step S207).

When determining that live view image data (including the time stamps) has been received (step S207: Yes), the device-side communication controller 571 stores the received live view image data (including the time stamps) in the second memory unit 54. Then, the device-side display controller 573 causes the display unit 52 to display a live view display screen including a live view image corresponding to the latest live view image data stored in the second memory unit 54 (step S208).

Figure 8:
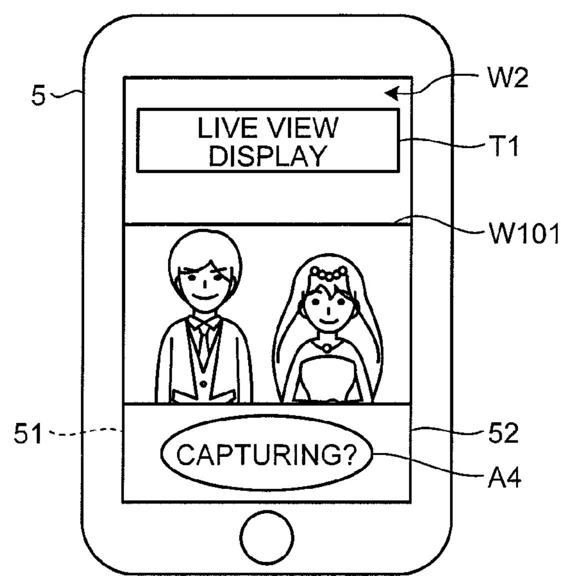
FIG. 8 is a diagram illustrating one example of a live view display screen displayed at step S208 described in FIG. 6.

FIG. 8 is a diagram corresponding to FIG. 4, which illustrates one example of a live view display screen W2 displayed at step S208.

For example, the device-side display controller 573 causes the display unit 52 to display the live view display screen W2 illustrated in FIG. 8 at step S208.

The live view display screen W2 includes a title image T1 indicating the title of the screen (live view display), a live view image W101 corresponding to the latest live view image data stored in the second memory unit 54, an operation icon A4 that accepts an operation for capturing, and the like, as illustrated in FIG. 8.

Subsequently, the imaging controller 574 determines whether an operation for capturing on the input unit 51 has been performed by the camera user (in the example of FIG. 8, the operation icon A4 with the word "Capturing?" has been touched by an operation on the touch panel (the input unit 51)) (step S209).

When determining that no operation for capturing has xbeen performed (step S209: No), the communication device 5 moves the process to step S211.

On the other hand, when determining that the operation for capturing has been performed (step S209: Yes), the imaging controller 574 transmits an instruction for capturing (including a request for transfer of captured image data obtained by capturing) to the imaging apparatus 4 via the device-side first communication unit 561 (step S210).

After step S210 or when determining that no operation for capturing has been performed (step S209: No), the device-side communication controller 571 then determines whether suspension request information (e-mail) has been received from the server 3 via the device-side communication unit 56 (step S211).

When determining that no suspension request information (e-mail) has been received (step S211: No), the communication device 5 moves the process to step S232.

On the other hand, when the suspension request information (e-mail) has been received (step S211: Yes), the communication device 5 executes a communication NG process (3) (step S212). After that, the communication device 5 moves the process to step S232.

The communication NG process (3) (step S212) will be described later in detail.

When determining at step S207 that no live view image data (including the time stamps) has been received (step S207: No), the device-side communication controller 571 then determines whether captured image data (including the time stamps) has been received from the imaging apparatus 4 via the device-side first communication unit 561 (step S213).

When determining that no captured image data has been received (step S213: No), the communication device 5 moves the process to step S232.

On the other hand, when determining that the captured image data has been received (step S213: Yes), the imaging controller 574 records the received captured image data (including the time stamps) in the image data recording unit 552 (step S214).

Subsequently, the device-side display controller 573 causes the display unit 52 to display a captured image display screen including a captured image corresponding to the latest captured image data recorded in the image data recording unit 552 (step S215).

Figure 9:
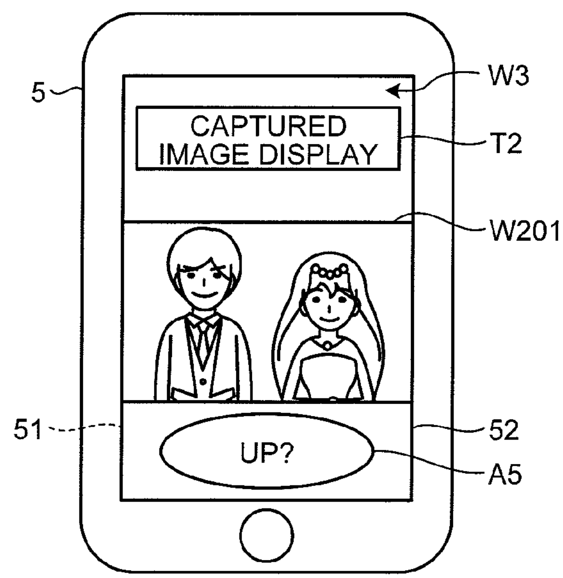
FIG. 9 is a diagram illustrating one example of a captured image display screen displayed at step S215 described in FIG. 6.

FIG. 9 is a diagram corresponding to FIG. 4, which illustrates one example of a captured image display screen W3 displayed at step S215.

For example, the device-side display controller 573 causes the display unit 52 to display the captured image display screen W3 illustrated in FIG. 9 at step S215.

The captured image display screen W3 includes a title image T2 indicating the title of the screen (captured image display), a captured image W201 corresponding to the latest captured image data recorded in the image data recording unit 552, an operation icon A5 that accepts an operation for uploading the captured image data to the server 3, and the like, as illustrated in FIG. 9.

Subsequently, the second control unit 57 determines whether an operation for uploading has been performed on the input unit 51 by the camera user (in the example of FIG. 9, the operation icon A5 with the word "Up?" has been touched by an operation on the touch panel (the input unit 51)) (step S216).

When determining that no operation for uploading has been performed (step S216: No), the second control unit 57 then determines whether a predetermined period of time has elapsed since the display of the captured image display screen at step S215 (step S217).

When determining that no predetermined period of time has elapsed (step S217: No), the communication device 5 returns the process to step S216.

On the other hand, when determining that the predetermined period of time has elapsed (step S217: Yes), the device-side display controller 573 terminates the display of the captured image display screen (step S218). After that, the communication device 5 moves the process to step S232.

When determining that the operation for uploading has been performed at step S216 (step S216: Yes), the second control unit 57 then determines whether a member registration has been made with the server 3 in the "album member registration mode" (step S219). For example, the second control unit 57 determines whether the member registration has been made depending on whether location information (URL) is recorded in the location information recording unit 553 (when the location position is recorded, the member registration has been already made).

When determining that no member registration has been made (step S219: No), the second control unit 57 executes a registration process for making a member registration (step S220).

The registration process (step S220) will be described later in detail.

After step S220 or when determining at step S219 that the member registration is completed (step S219: Yes), the second control unit 57 then determines whether the member participates in the creation of an album managed by the server 3 in the "album creation mode" (step S221). For example, the second control unit 57 connects to the internet network N via the device-side communication unit 56 to access the server 3 and recognize whether the member participates in the creation of the album managed by the server 3.

When determining that the member does not participate in the creation of the album (step S221: No), the second control unit 57 executes a creation process for participating in the creation of the album (step S222).

The creation process (step S222) will be described later in detail.

After step S222 or when determining at step S221 that the member participates in the creation of the album (step S221: Yes), the device-side display controller 573 causes the display unit 52 to display an under-communication screen indicating that uploading is in progress (step S223).

Figure 10:
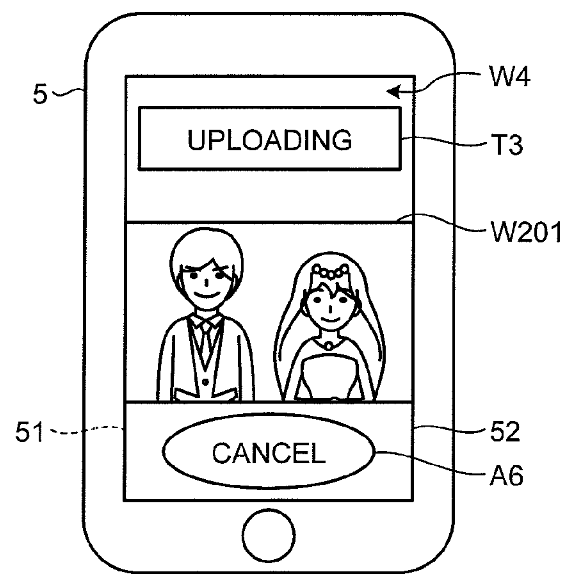
FIG. 10 is a diagram illustrating one example of an under-communication screen displayed at step S223 described in FIG. 6.

FIG. 10 is a diagram corresponding to FIG. 4, which illustrates one example of an under-communication screen W4 displayed at step S223.

For example, at step S223, the device-side display controller 573 causes the display unit 52 to display the under-communication screen W4 illustrated in FIG. 10.

The under-communication screen W4 includes a title image T3 indicative of the title of the screen (uploading), the captured image W201 corresponding to the captured image data to be uploaded to the server 3, an operation icon A6 for accepting an operation for cancelling the uploading of the captured image data to the server 3, and the like, as illustrated in FIG. 10.

Subsequently, the communication status determination unit 572 determines whether the communication status in the first communication mode such as Wi-Fi (registered trademark) is favorable for communication of image data (step S224: determination step).

When determining that the communication status in the first communication mode is not favorable (step S225: No), the second control unit 57 executes a communication NG process (2) (step S226). After that, the communication device 5 moves the process to step S232.

The communication NG process (2) (step S226) will be described later in detail.

On the other hand, when determining that the communication status in the first communication mode is favorable (step S225: Yes), the device-side communication controller 571 connects to the internet network N in the first communication mode such as Wi-Fi (registered trademark) via the access point A and transmits to the server 3 the latest captured image data stored in the image data recording unit 552 (including transmission of identification information for the terminal of this communication device 5) (step S227). After that, the communication device 5 moves the process to step S232.

While the under-communication screen is displayed, when an operation for cancelling has been performed on the input unit 51 by the camera user (In the example of FIG. 10, the operation icon A6 with the word "Cancel" has been touched by an operation on the touch panel (the input unit 51)), the communication device 5 moves the process to step S232 without executing steps S226 and S227.

When determining at step S203 that the "camera communication mode" has not been selected (step S203: No), the second control unit 57 then determines whether the "album member registration mode" has been selected by the camera user's operation on the input unit 51 (in the example of FIG. 7, whether the operation icon A2 has been touched by an operation on the touch panel (the input unit 51) (step S228).

When determining that the "album member registration mode" has been selected (step S228: Yes), the second control unit 57 executes a registration process for making a member registration (step S229). After that, the communication device 5 moves the process to step S232.

The registration process (step S229) will be described later in detail.

On the other hand, when determining that the "album member registration mode" has not been selected (step S228: No), the second control unit 57 then determines whether the "album creation mode" has been selected by the camera user's operation on the input unit 51 (in the example of FIG. 7, the operation icon A3 has been touched by an operation on the touch panel (the input unit 51) (step S230).

When determining that the "album creation mode" has not been selected (step S230: No), the communication device 5 returns the process to step S201.

On the other hand, when determining that the "album creation mode" has been selected (step S230: Yes), the second control unit 57 executes a creation process for participating in the creation of the album (step S231). After that, the communication device 5 moves the process to step S232.

The creation process (step S231) will be described later in detail.

After steps S206, S212, S218, S226, S227, S229, and S231 or when determining at step S213 that no captured image data has been received (step S213: No), the second control unit 57 then determines whether the communication device 5 has been powered off by the camera user's operation on the input unit 51 (step S232).

When determining the communication device 5 has been powered off (step S232: Yes), the communication device 5 terminates the process.

On the other hand, determining that the communication device 5 has not been powered off (step S232: No), the second control unit 57 then determines whether an operation for displaying the initial screen for prompting selection from among the various modes has been performed by the camera user's operation on the input unit 51 (step S233).

When determining that the operation for displaying the initial screen has been performed (step S233: Yes), the communication device 5 returns the process to step S202.

On the other hand, when determining that no operation for displaying the initial screen has been performed (step S233: No), the communication device 5 returns the process to step S203 to continue the already set mode.

Communication NG Process (1)

Next, the communication NG process (1) (step S206) will be described.

Figure 11:
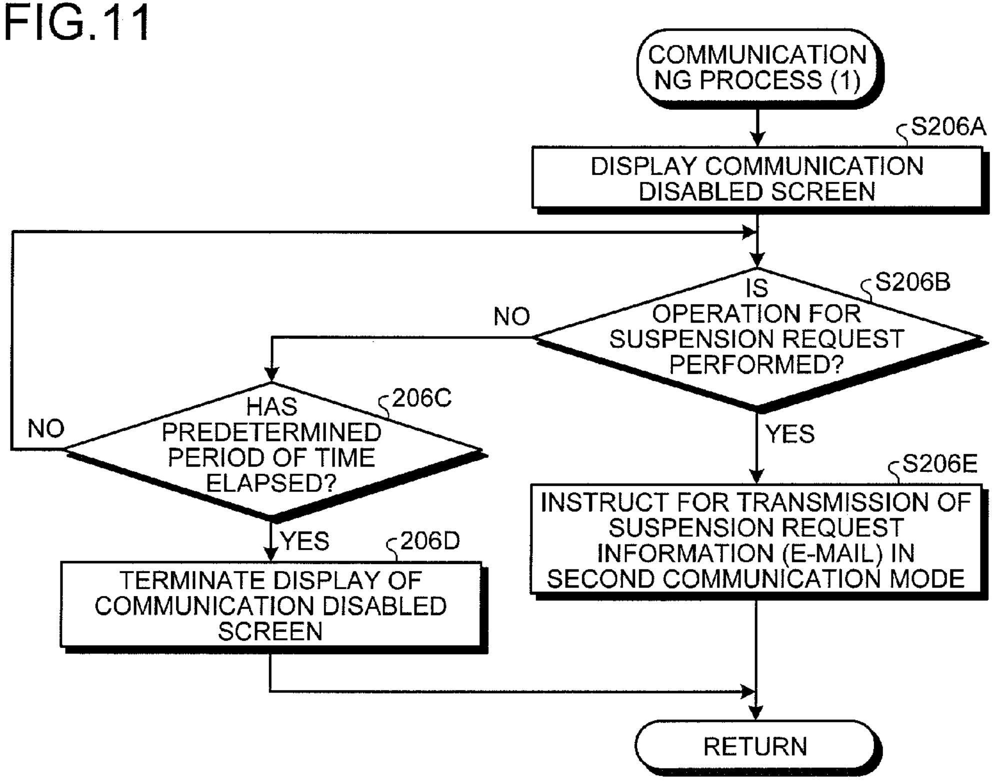
FIG. 11 is a flowchart of a communication NG process (1) (step S206) described in FIG. 6.

FIG. 11 is a flowchart of the communication NG process (1) (step S206).

The device-side display controller 573 causes the display unit 52 to display a communication disabled screen indicating that communications cannot be performed (communications are disabled) in the first communication mode such as Wi-Fi (registered trademark) (step S206A).

Figure 12:
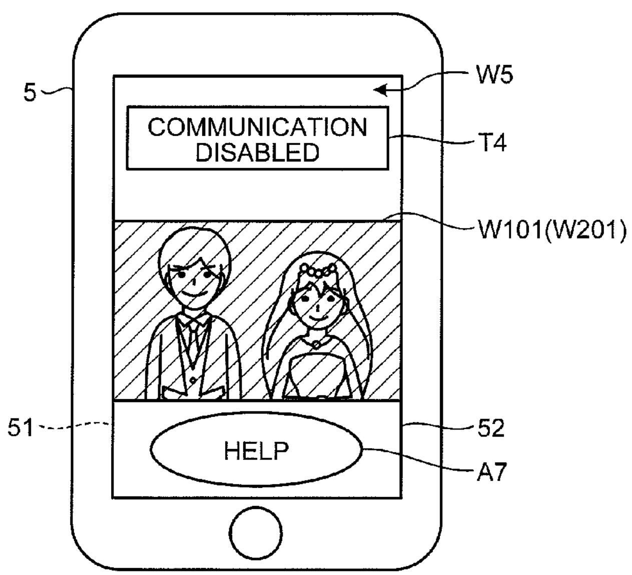
FIG. 12 is a diagram illustrating one example of an image displayed at step S206A described in FIG. 11.

FIG. 12 is a diagram corresponding to FIG. 4, which illustrates one example of a communication disabled screen W5 displayed at step S206A.

For example, the device-side display controller 573 causes the display unit 52 to display the communication disabled screen W5 illustrated in FIG. 12 at step S206A.

The communication disabled screen W5, as illustrated in FIG. 12, includes a title image T4 indicative of the title of the screen (communications disabled), the live view image W101 or the captured image W201 displayed at previous step S208 or steps S215 and S223, an operation icon A7 that accepts an operation for requesting other communication devices 5 for suspension of communications in the first communication mode such as Wi-Fi (registered trademark), and the like.

The live view image W101 or the captured image W201 displayed on the communication disabled screen W5 is lower in brightness than the live view image W101 or the captured image W201 illustrated in FIG. 8 (in the example of FIG. 12, the lower brightness is represented by slant lines).

Subsequently, the second control unit 57 determines whether an operation for suspension request has been performed on the input unit 51 by the camera user (in the example of FIG. 12, the operation icon A7 with the word "Help" has been touched by an operation on the touch panel (the input unit 51)) (step S206B).

When determining that no operation for suspension request has been performed (step S206B: No), the second control unit 57 then determines whether a predetermined period of time has elapsed from the display of the communication disabled screen at step S206A (step S206C).

When determining that the predetermined period of time has not elapsed (step S206C: No), the communication device 5 returns the process to step S206B.

On the other hand, when determining that the predetermined period of time has elapsed (step S206C: Yes), the device-side display controller 573 terminates the process of the communication disabled screen (step S206D). After that, the communication device 5 returns the process to the main routine described in FIG. 6.

When determining at step S206 that the operation for suspension request has been performed (step S206B: Yes), the device-side communication controller 571 connects to the internet network N via the base station B in the second communication mode such as 3G to access the server 3 and provide to the server 3 an instruction for transmission of suspension request information (e-mail) (including transmission of identification information for the terminal of this communication device 5) (step S206E: suspension request step). After that, the communication device 5 returns the process to the main routine described in FIG. 6.

Communication NG Process (2)

Next, the communication NG process (2) (step S226) will be described.

Figure 13:
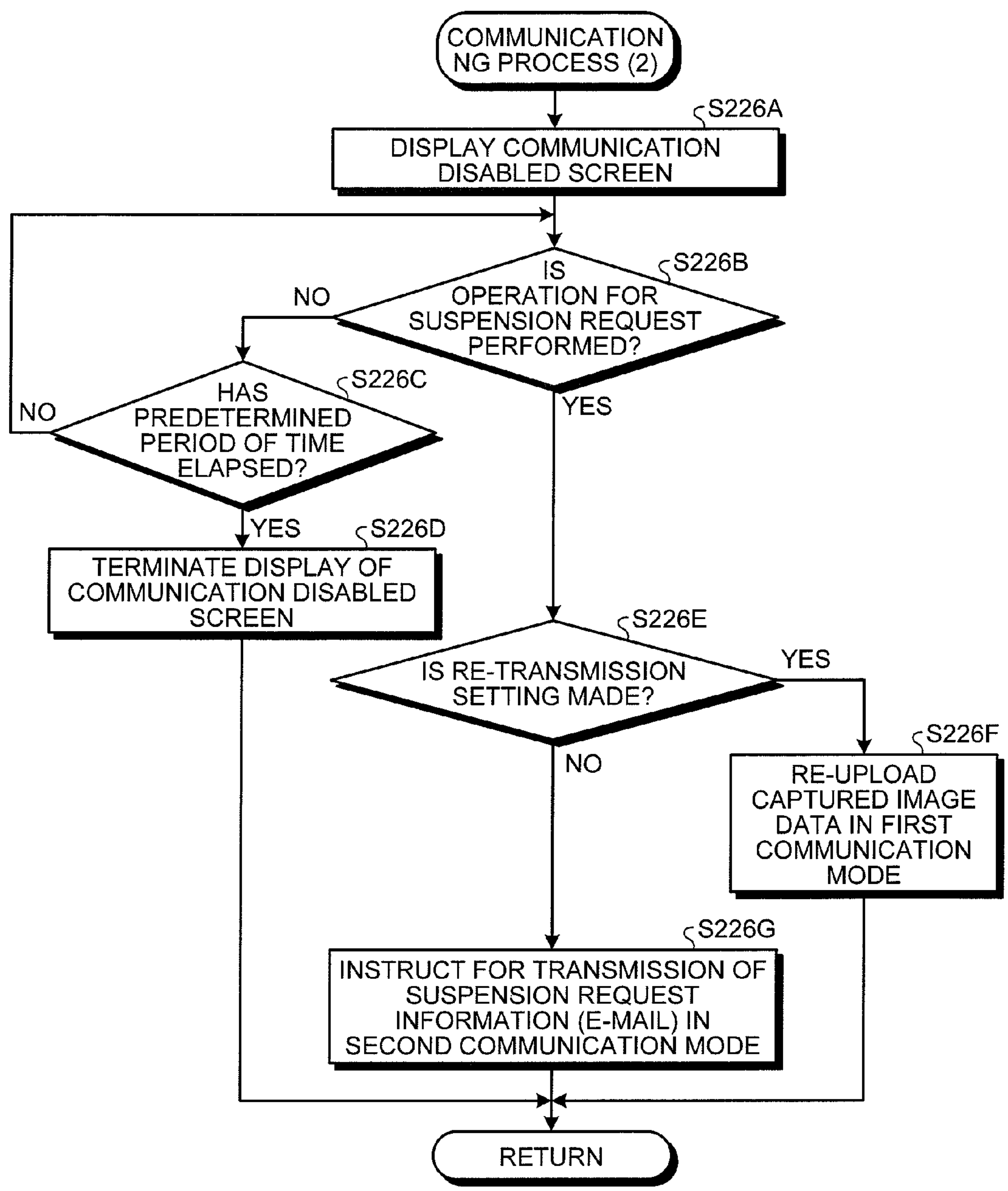
FIG. 13 is a flowchart of a communication NG process (2) (step S226) described in FIG. 6.

FIG. 13 is a flowchart of the communication NG process (2) (step S226).

The device-side display controller 573 causes the display unit 52 to display the communication disabled screen indicating that communications cannot be performed (communications are disabled) in the first communication mode such as Wi-Fi (registered trademark) (step S226A).

For example, the device-side display controller 573 causes the display unit 52 to display the communication disabled screen W5 (including the title image T4, the captured image W201 displayed at the previous step S223, and the operation icon A7) illustrated in FIG. 12 at step S226A.

Subsequently, the second control unit 57 determines whether an operation for suspension request has been performed by the camera user's on the input unit 51 (in the example of FIG. 12, the operation icon A7 with the word "Help" has been touched by an operation on the touch panel (the input unit 51) (step S226B).

When determining that no operation for suspension request has been performed (step S226B: No), the second control unit 57 then determines whether a predetermined period of time has elapsed from display of the communication disabled screen at step S226A (step S226C).

When determining that no predetermined period of time has elapsed (step S226C: No), the communication device 5 returns the process to step S226B.

On the other hand, when the predetermined period of time has elapsed (step S226C: Yes), the device-side display controller 573 terminates the display of the communication disabled screen (step S226D). After that, the communication device 5 returns the process to the main routine illustrated in FIG. 6.

When determining at step S226B that the operation for suspension request has been performed (step S226B: Yes), the second control unit 57 then determines whether a retransmission setting flag is in the on state indicating that captured image data having not been uploaded due to disability of communications in the first communication mode such as Wi-Fi (registered trademark) is to be reuploaded (whether a re-transmission setting is made) (step S226E). The re-transmission setting flag is stored in the second memory unit 54. The second control unit 57 sets the flag in the on state for performing re-transmission or the off state for not performing re-transmission, according to the camera user's operation on the input unit 51.

When determining that the re-transmission setting is made (step S226E: Yes), the device-side communication controller 571 connects to the internet network N via the access point A in the first communication mode such as Wi-Fi (registered trademark) and re-transmits to the server 3 the latest captured image data stored in the image data recording unit 552 (including re-transmission of identification information for the terminal of this communication device 5) (step S226F). After that, the communication device 5 returns the process to the main routine illustrated in FIG. 6.

Alternatively, the communication device 5 may execute step S226F after a predetermined period of time has elapsed from execution of the operation for suspension request and the communication status in the first communication mode such as Wi-Fi (registered trademark) has become favorable.

On the other hand, when determining that no re-transmission setting is made (step S226E: No), the device-side communication controller 571 connects to the internet network N via the base station B in the second communication mode such as 3G to access the server 3 and provide to the server 3 an instruction for transmission of suspension request information (e-mail) (including transmission of identification information for the terminal of this communication device 5) (step S226G: suspension request step). After that, the communication device 5 returns the process to the main routine illustrated in FIG. 6.

Communication NG Process (3)

Next, the communication NG process (3) (step S212) will be described.

Figure 14:
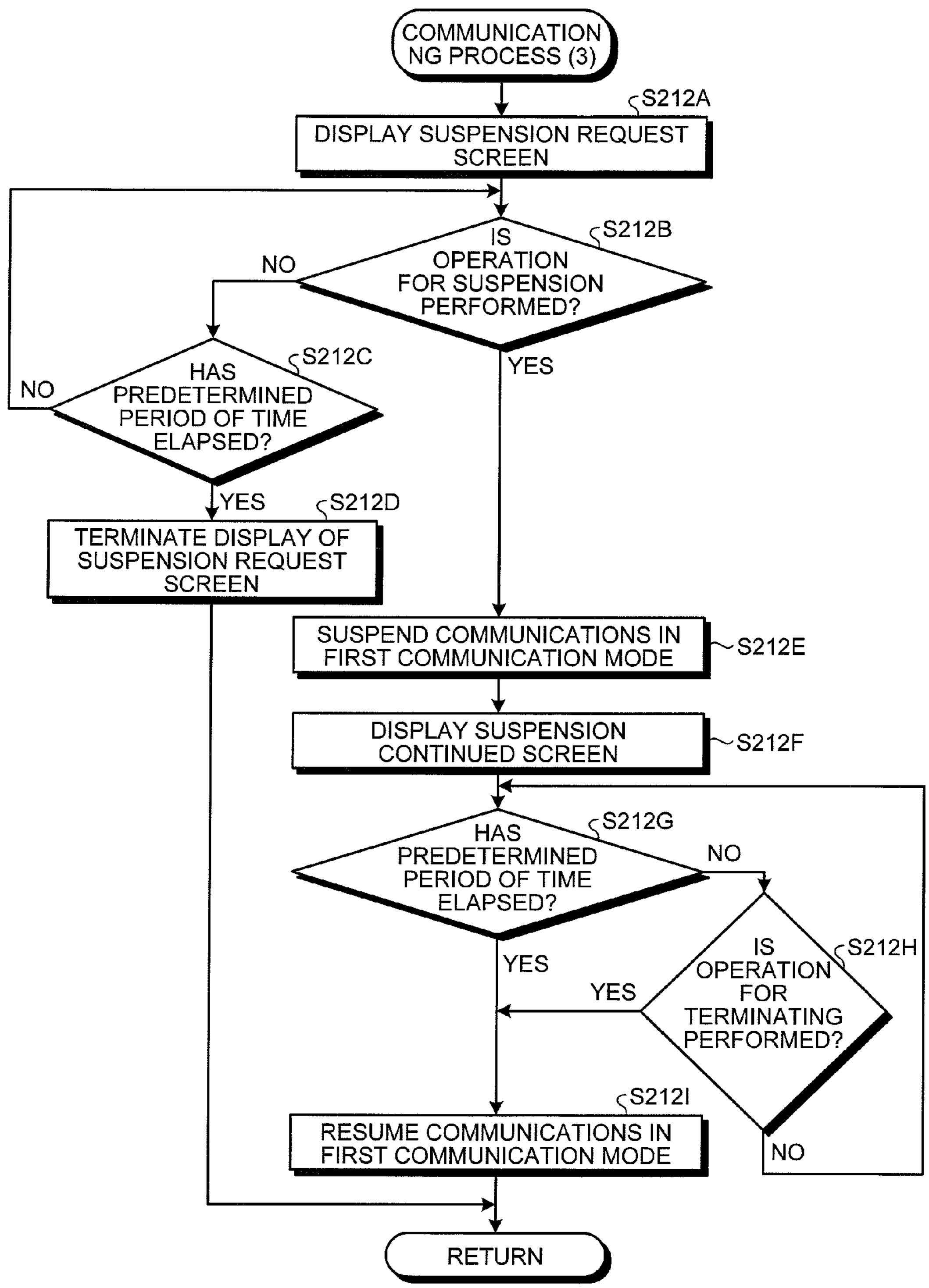
FIG. 14 is a flowchart of a communication NG process (3) (step S212) described in FIG. 6.

FIG. 14 is a flowchart of the communication NG process (3) (step S212).

The device-side display controller 573 notifies receipt of a request for suspension of communications in the first communication mode such as Wi-Fi (registered trademark) (receipt of suspension request information (e-mail)) from another communication device 5, and causes the display unit 52 to display a suspension request screen for prompting suspension of communications in the first communication mode (step S212A).

Figure 15:
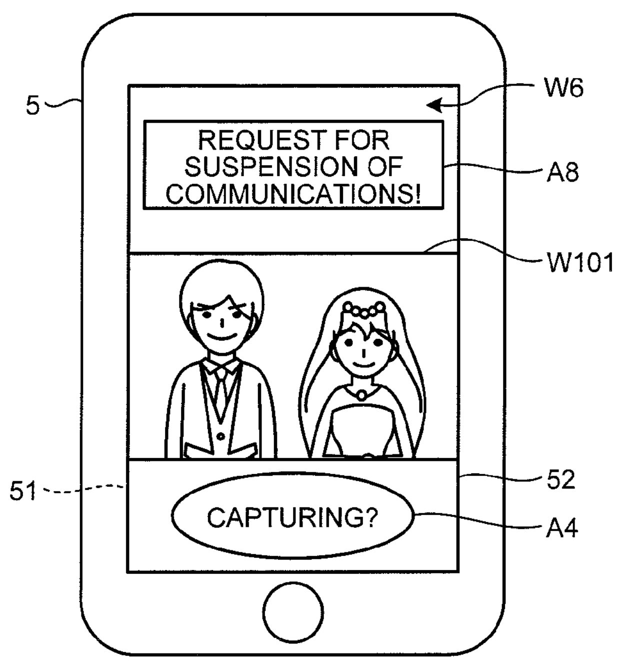
FIG. 15 is a diagram illustrating one example of a suspension request screen displayed at step S212A described in FIG. 14.

FIG. 15 is a diagram corresponding to FIG. 4, which illustrates one example of a suspension request screen W6 displayed at step S212A.

For example, the device-side display controller 573 causes the display unit 52 to display the suspension request screen W6 illustrated in FIG. 15 at step S212A.

The suspension request screen W6 includes an operation icon A8 that accepts an operation for suspending communications in the first communication mode such as Wi-Fi (registered trademark) at this communication device 5, the live view image W101 corresponding to the latest live view image data recorded in the image data recording unit 552, the operation icon A4 that accepts an operation for capturing, and the like, as illustrated in FIG. 15.

Subsequently, the second control unit 57 determines whether an operation for suspension has been performed on the input unit 51 by the camera user (in the example of FIG. 15, the operation icon A8 with the phrase "request for suspension of communications!" has been touched by an operation on the touch panel (the input unit 51) (step S212B).

When determining that no operation for suspension has been performed (step S212B: No), the second control unit 57 then determines whether a predetermined period of time has elapsed from the display of the suspension request screen at step S212A (step S212C).

When determining that no predetermined period of time has elapsed (step S212C: No), the communication device 5 returns the process to step S212B.

On the other hand, when determining that the predetermined period of time has elapsed (step S212C: Yes), the device-side display controller 573 terminates the display of the suspension request screen (step S212D). After that, the communication device 5 returns the process to the main routine described in FIG. 6.

When determining at step S212B that the operation for suspension has been performed (step S212B: Yes), the device-side communication controller 571 suspends communications in the first communication mode such as Wi-Fi (registered trademark) (including communications with the imaging apparatus 4 and communications with the access point A) (step S212E). As for the "suspend communications in the first communication mode" at step S212E described in FIG. 14, the term "suspend" is used for the sake of simplification. There are actually several methods for suspending communications by which to disconnect Wi-Fi (registered trademark) or by which to stop only transfer of live view images (live view image data) without disconnection of Wi-Fi (registered trademark). The former method is more effective, but the latter method is also acceptable because automatic control may not be enabled by applications in certain communication specifications. In addition, the latter method is more advantageous in that the time required for recovery is shorter.

Subsequently, the device-side display controller 573 causes the display unit 52 to display a suspension continued screen indicating that communications in the first communication mode such as Wi-Fi (registered trademark) continues to be suspended (step S212F).

Figure 16:
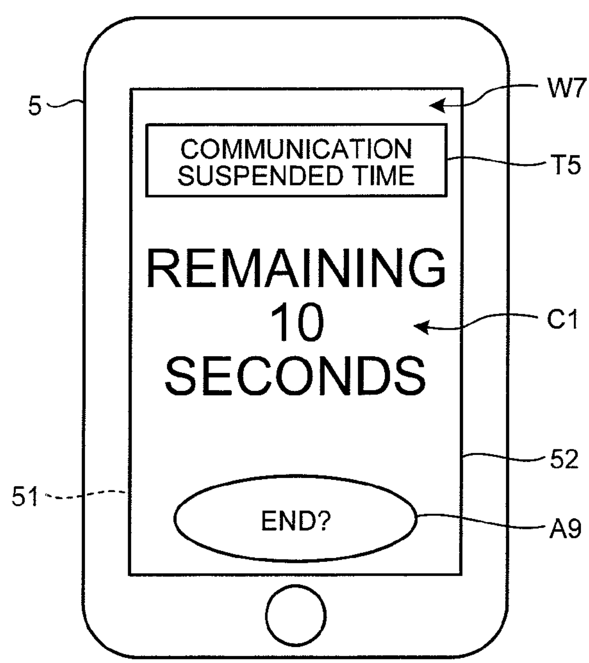
FIG. 16 is a diagram illustrating one example of a suspension continued screen displayed at step S212F described in FIG. 14.

FIG. 16 is a diagram corresponding to FIG. 4, which illustrates one example of a suspension continued screen W7 displayed at step S212F.

For example, the device-side display controller 573 causes the display unit 52 to display the suspension continued screen W7 illustrated in FIG. 16 at step S212F.

The suspension continued screen W7 includes a title image T5 indicative of the title of the screen (communication suspended time), time information C1 indicative of the remaining time for suspension of communications in the first communication mode such as Wi-Fi (registered trademark) (the time before resumption of the communications), an operation icon A9 that accepts an operation for terminating the suspension of the communications (operation for resuming the communications), and the like, as illustrated in FIG. 16.

Subsequently, the second control unit 57 determines whether a predetermined period of time has elapsed from the display of the suspension continued screen at step S212F (step S212G).

When determining that no predetermined period of time has elapsed (step S212G: No), the second control unit 57 then determines whether an operation for terminating has been performed on the input unit 51 by the camera user (in the example of FIG. 16, the operation icon A9 with the word "End?" has been touched by an operation on the touch panel (the input unit 51) (step S212H).

When no operation for terminating has been performed (step S212H: No), the communication device 5 returns the process to step S212G.

Then, when determining that the predetermined period of time has elapsed (step S212G: Yes) or that the operation for terminating has been performed (step S212H: Yes), the device-side communication controller 571 resumes the communications in the first communication mode such as Wi-Fi (registered trademark) (resumes the connection for communications with the imaging apparatus 4 and the connection for communications with the access point A) (step S212I). After that, the communication device 5 returns the process to the main routine described in FIG. 6.

Registration Process

Next, the registration processes (steps S220 and S229) will be described.

The registration processes executed at steps S220 and S229 are the same. Thus, only the registration process (step S229) will be described below.

Figure 17:
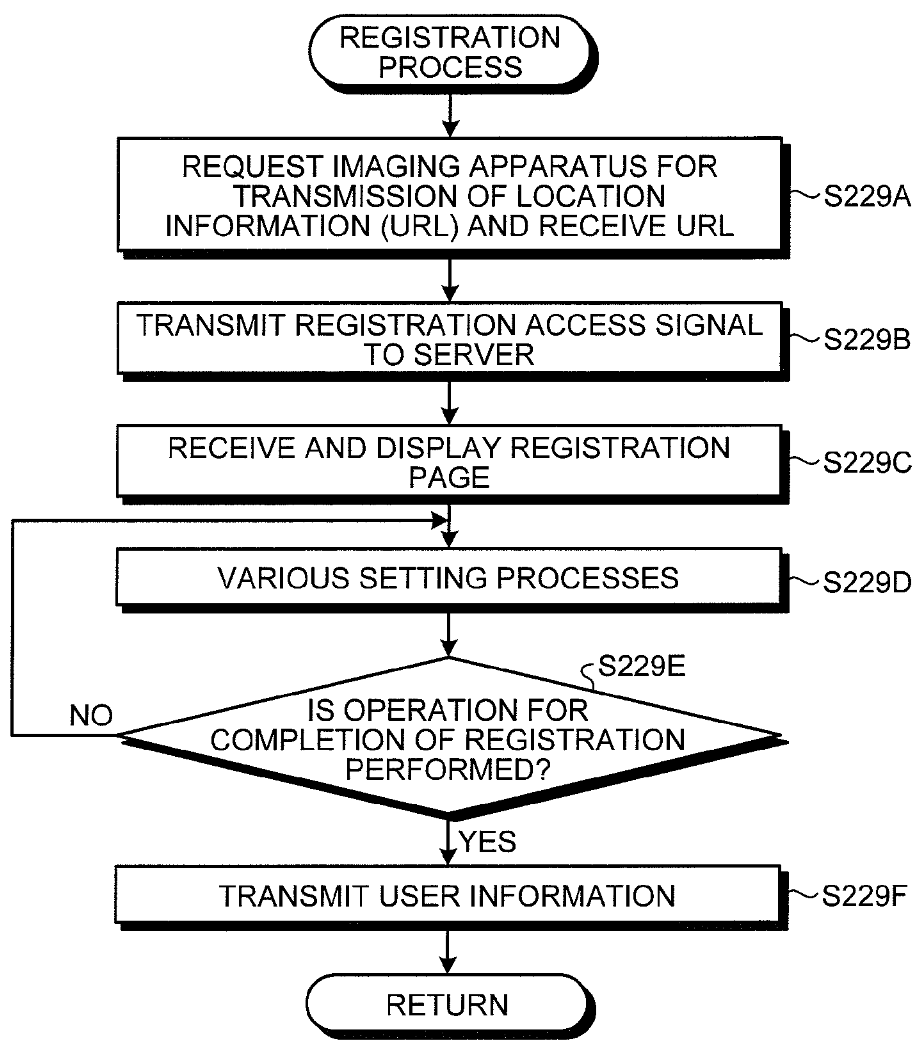
FIG. 17 is a flowchart of a registration process (step S229) described in FIG. 6.

FIG. 17 is a flowchart of the registration process (step S229).

The device-side communication controller 571 makes a request for transmission of the location information (URL) to the imaging apparatus 4 via the device-side first communication unit 561, and receives the location information from the imaging apparatus 4 (step S229A). Then, the device-side communication controller 571 records the received location information in the location information recording unit 553.

Subsequently, the device-side communication controller 571 connects to the internet network N via the access point A in the first communication mode such as Wi-Fi (registered trademark), and transmits to the server 3 a registration access signal indicating that a member registration is to be made (including the identification information for the terminal of this communication device 5) (step S229B).

Subsequently, the second control unit 57 receives a registration page for member registration from the server 3 via the device-side first communication unit 561, the access point A, and the internet network N, and causes the display unit 52 to display the received registration page (step S229C).

Figure 18:
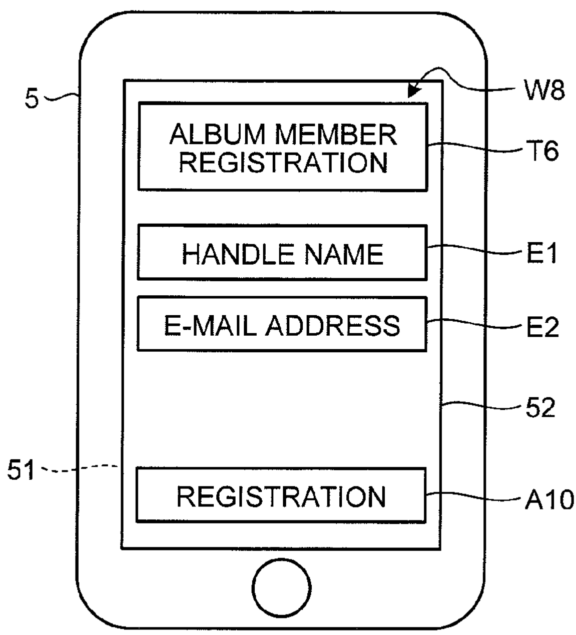
FIG. 18 is a diagram illustrating one example of a registration page displayed at step S229C described in FIG. 17.

FIG. 18 is a diagram illustrating one example of a registration page W8 displayed at step S229C.

For example, the device-side display controller 573 causes the display unit 52 to display the registration page W8 illustrate in FIG. 18 at step S229C.

The registration page W8 includes a title image T6 indicative of the title of the page (album member registration), a handle name entry field E1, an e-mail address entry field E2, an operation icon A10 that accepts an operation for completion of registration to make a member registration with the entered user information (the handle name and the e-mail address), and the like, as illustrated in FIG. 18.

Alternatively, the registration page W8 may include an operation icon that accepts an operation for terminating a member registration in midstream such that the operation icon can be operated to terminate the member registration in midstream.

Subsequently, the second control unit 57 executes various setting processes according to the camera user's operation for entering user information into the input unit 51 (step S229D).

For example, while the registration page W8 illustrated in FIG. 18 is displayed on the display unit 52, when the entry field E1 or the entry field E2 is touched by the camera user's operation on the touch panel (the input unit 51), the device-side display controller 573 superimposes a keyboard entry icon (not illustrated) for accepting an operation for entering Roman letters or an operation for entering Japanese Kana letters on the registration page W8. Then, when the handle name or the e-mail address is entered into the entry field E1 or the entry field E2 by the camera user's operation on the keyboard entry icon, the second control unit 57 stores the user information related to the entered handle name or e-mail address in the second memory unit 54.

Subsequently, the second control unit 57 determines whether an operation for completion of registration has been performed by the camera user on the input unit 51 (in the example of FIG. 18, whether the operation icon A10 with the word "registration" has been touched by an operation on the touch panel (the input unit 51)) (step S229E).

When determining that no operation for completion of registration has been performed (step S229E: No), the communication device 5 returns the process to step S229D.

On the other hand, when the operation for completion of registration has been performed (step S229E: Yes), the device-side communication controller 571 transmits to the server 3 the user information entered by the camera user (the user information stored in the second memory unit 54), via the device-side first communication unit 561, the access point A, and the internet network N (step S229F). After that, the communication device 5 returns the process to the main routine illustrated in FIG. 6.

At steps S229B to S229F described above, the communication device 5 connects to the internet network N via the access point A in the first communication mode such as Wi-Fi (registered trademark) to communicate with the server 3. However, the present invention is not limited to this configuration. For example, at steps S229B to S229F described above, when the communication status in the first communication mode such as Wi-Fi (registered trademark) is not favorable for communications of image data, the communication device 5 may connect to the internet network N via the base station B in the second communication mode such as 3G to communicate with the server 3.

Creation Process

Next, creation processes (steps S222 and S231) will be described.

The creation processes executed at steps S222 and S231 are the same. Thus, only the creation process (step S231) will be described below.

Figure 19:
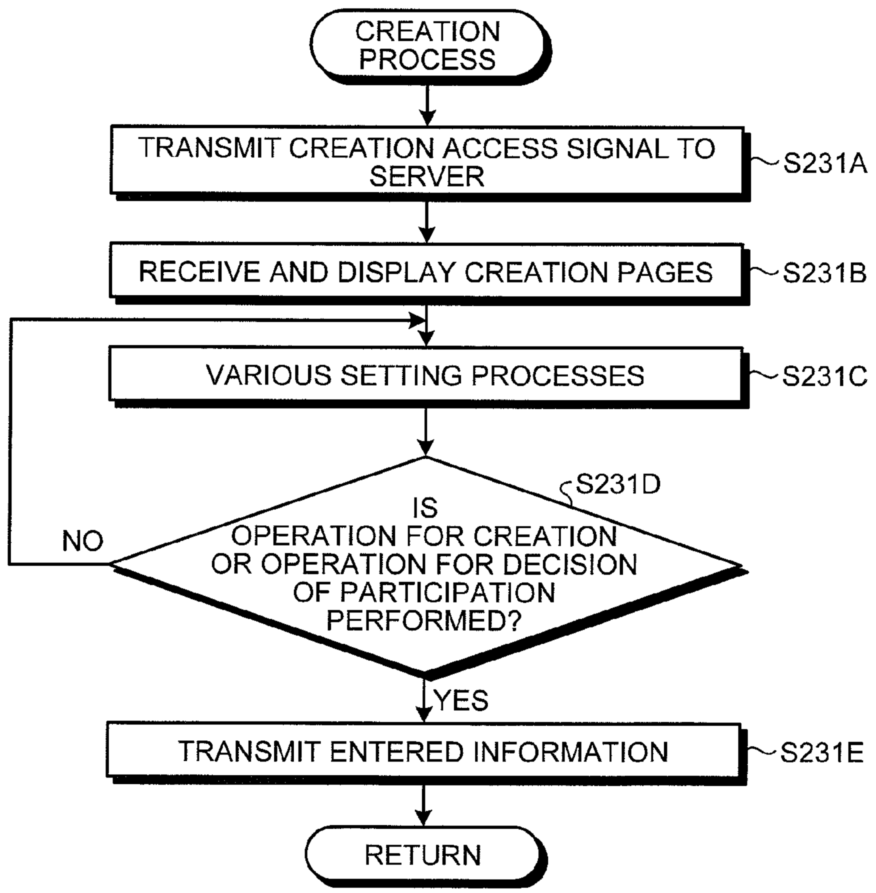
FIG. 19 is a flowchart of a creation process (step S232) described in FIG. 6.

FIG. 19 is a flowchart of the creation process (step S231).

The device-side communication controller 571 connects to the internet network N via the access point A in the first communication mode such as Wi-Fi (registered trademark) and transmits to the server 3 a creation access signal indicating that album creation is to be performed (including the identification information for the terminal of this communication device 5) (step S231A).

Subsequently, the second control unit 57 receives creation pages for album creation from the server 3 via the device-side first communication unit 561, the access point A, and the internet network N, and causes the display unit 52 to display the received creation pages (step S231B).

Subsequently, the second control unit 57 executes various setting processes according to the camera user's operation on the input unit 51 (step S231C).

FIG. 20 to FIG. 23 are diagrams illustrating examples of first to fourth creation pages W9 to W12 displayed at steps S231B and S231C.

Figure 20:
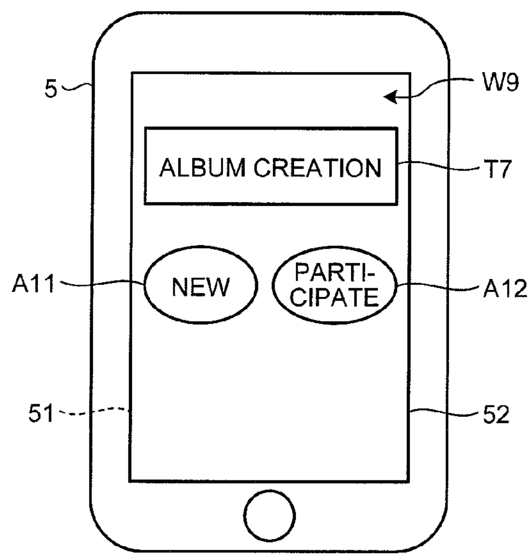
FIG. 20 is a diagram illustrating one example of a creation page displayed at steps S231B and S231C described in FIG. 19.

For example, the device-side display controller 573 causes the display unit 52 to display the first creation page W9 illustrated in FIG. 20 at step S231B.

The first creation page W9 includes a title image T7 indicative of the title of the page (album creation), an operation icon A11 that accepts a new creation operation for creating a new album, an operation icon A12 that accepts a participation operation for participating in album creation, and the like, as illustrated in FIG. 20.

The first creation page W9 may be configured to include an operation icon that accepts an exit operation for terminating album creation in midstream so that the operation icon can be operated to terminate the album creation in midstream.

While the first creation page W9 illustrated in FIG. 20 is displayed on the display unit 52, when the operation icon A11 with the word "new" has been touched by the camera user's operation on the touch panel (the input unit 51) at step S231C, the second control unit 57 makes a request to the server 3 for transmission of the next page (the second creation page W10 illustrated in FIG. 21) and causes the display unit 52 to display the received second creation page W10).

Figure 21:
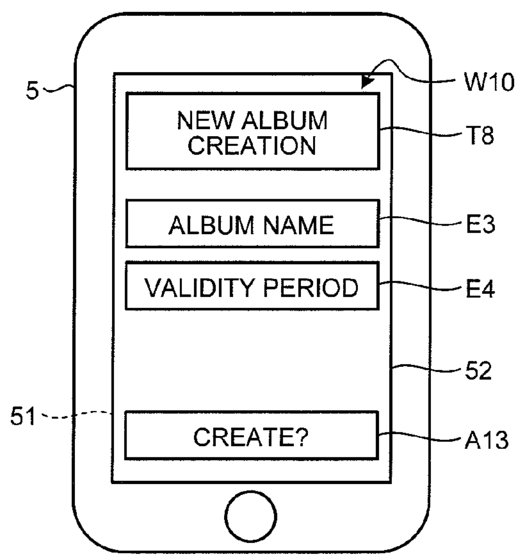
FIG. 21 is a diagram illustrating one example of a creation page displayed at steps S231B and S231C described in FIG. 19.

The second creation page W10 includes a title image T8 indicative of the title of the page (new album creation), an album name entry field E3, an album validity period entry field E4, an operation icon A13 that accepts a creation operation for creating a new album with the entered contents, and the like, as illustrated in FIG. 21.

The second creation page W10 may be configured to include an operation icon that accepts an exit operation for terminating new album creation so that the operation icon can be operated to terminate the new album creation in midstream. In addition, the second creation page W10 may be configured to include an operation icon that accepts a page return operation for returning to the previous page (the first creation page W9) so that the operation icon can be operated to return to the previous page.

While the second creation page W10 illustrated in FIG. 21 is displayed on the display unit 52, when the entry field E3 or the entry field E4 has been touched by the camera user's operation on the touch panel (the input unit 51) at step S231C, the device-side display controller 573 superimposes a keyboard entry icon (not illustrated) for accepting an operation for entering Roman letters or an operation for entering Japanese Kana letters on the second creation page W10. Then, when the name of the album (in the example of FIG. 4, the wedding ceremony of "Gr" and "Br") or the album validity period is entered into the entry field E3 or the entry field E4 by the camera user's operation on the keyboard entry icon, the second control unit 57 stores information on the entered album name or album validity period in the second memory unit 54.

Meanwhile, while the first creation page W9 illustrated in FIG. 20 is displayed on the display unit 52, when the operation icon A12 with the word "participate" has been touched by the camera user's operation on the touch panel (the input unit 51) at step S231C, the second control unit 57 makes a request to the server 3 for transmission of the next page (the third creation page W11 illustrated in FIG. 22) and causes the display unit 52 to display the received third creation page W11.

Figure 22:
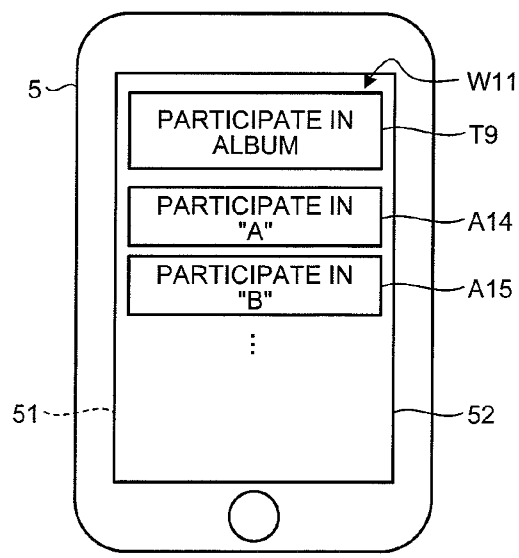
FIG. 22 is a diagram illustrating one example of a creation page displayed at steps S231B and S231C described in FIG. 19.

The third creation page W11 includes a title image T9 indicative of the title of the page (album participation), operation icons A14 and A15 that accept a participation declaration operation for declaring participation in the album "A" or "B" under creation, and the like, as illustrated in FIG. 22.

The third creation page W11 may be configured to include an exit operation for terminating the participation in the album creation in midstream so that the operation icon can be operated to terminate the participation in the album creation. In addition, the third creation page W11 may be configured to include an operation icon that accepts a page return operation for returning to the previous page (the first creation page W9) so that the operation icon can be operated to return to the previous page.

While the third creation page W11 illustrated in FIG. 22 is displayed on the display unit 52, when the operation icon A14 or A15 with the album name "A" or "B" has been touched by the camera user's operation on the touch panel (the input unit 51) at step S231C, the second control unit 57 transmits to the server 3 the information related to the album name corresponding to the touched operation icon A14 or A15, makes a request to the server 3 for transmission of the next page (the fourth creation page W12 illustrated in FIG. 23), and causes the display unit 52 to display the received fourth creation page W12.

Figure 23:
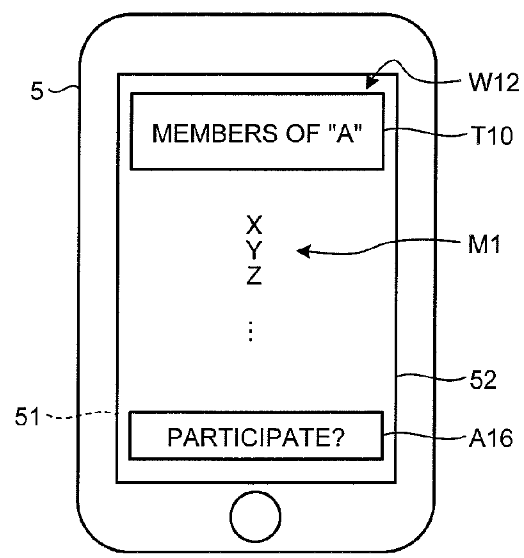
FIG. 23 is a diagram illustrating one example of a creation page displayed at steps S231B and S231C described in FIG. 19.

FIG. 23 illustrates the fourth creation page W12 to be displayed on the display unit 52 when the operation icon A14 with the album name "A" (in the example of FIG. 4, the wedding ceremony of "Gr" and "Br") has been touched.

The fourth creation page W12 includes a title image T10 indicative of the title of the page (members of "A"), a member image M1 indicative of the members participating in the album name "A," an operation icon A16 that accepts a participation decision operation for deciding participation in the album "A" under creation, and the like, as illustrated in FIG. 23.

The fourth creation page W12 may be configured to include radio buttons adjacent to the members in the member image M1 so that the radio buttons can be operated to select the members to participate in the album creation.

Subsequently, the second control unit 57 determines whether a creation operation or a participation decision operation has been performed by the camera user on the input unit 51 (in the example of FIG. 21 or FIG. 22, the operation icon A13 or A16 with the word "create?" or "participate?" has been touched by an operation on the touch panel (the input unit 51)) (step S231D).

When determining that no creation operation or participation decision operation has been performed (step S231D: No), the communication device 5 returns the process to step S231C.

On the other hand, when determining that the creation operation or the participation decision operation has been performed (step S231D: Yes), the device-side communication controller 571 transmits to the server 3 the information entered by the camera user via the device-side first communication unit 561, the access point A, and the internet network N (step S231E).

The information to be transmitted to the server 3 (the information entered by the camera user) at step S231E is as described below.

That is, in the case where the creation operation (in the example of FIG. 21, touch on the operation icon A13) has been performed by the camera user, the information relates to the entered album name and album validity period.

Otherwise, in the case where the participation decision operation (in the example of FIG. 23, touch on the operation icon A16) has been performed by the camera user, the information relates to the album name under which the participation declaration operation (in the example of FIG. 22, touch on the operation icon A14 or A15) has been performed.

At steps S231A to S231E described above, the communication device 5 connects to the internet network N via the access point A in the first communication mode such as Wi-Fi (registered trademark) to communicate with the server 3. However, the present invention is not limited to this configuration. For example, at steps S231A to S231E described above, when the communication status in the first communication mode such as Wi-Fi (registered trademark) is not favorable for communications of image data, the communication device 5 may connect to the internet network N via the base station B in the second communication mode such as 3G to communicate with the server 3.

Operations of the Server

Next, operations of the server 3 will be described.

FIG. 24 is a flowchart of operations of the server 3.

The server-side communication controller 341 determines whether a registration access signal (including the identification information for the terminal of the communication device 5 as a transmission source) has been received via the server-side communication unit 31 and the internet network N (step S301).

When determining that the registration access signal has been received (step S301: Yes), the terminal determination unit 342 then determines the identification information for the communication device 5 as a transmission source having made access, according to the received registration access signal (step S302).

Then, the server-side display controller 345 transmits to the communication device 5 determined at step S302 the registration page specified according to the received registration access signal (for example, the registration page W8 illustrated in FIG. 18) via the server-side communication unit 31 and the internet network N (step S303).

Subsequently, the user database management unit 343 records in the user database 32 the user information received from the communication device 5 via the server-side communication unit 31 and the internet network N (the user information transmitted at step S229F from the communication device 5 determined at step S302) in association with the identification information for the communication device 5 determined at step S302 (step S304). After that, the server 3 returns the process to step S301.

When determining at step S301 that no registration access signal has been received (step S301: No), the server-side communication controller 341 then determines whether a creation access signal (including the identification information for the terminal of the communication device 5 as a transmission source) has been received via the server-side communication unit 31 and the internet network N (step S305).

When determining that the creation access signal has been received (step S305: Yes), the terminal determination unit 342 then determines the identification information for the communication device 5 as a transmission source having made access, according to the received creation access signal (step S306).

Then, the server-side display controller 345 transmits the creation pages specified according to the received creation access signal (for example, the creation pages W9 to W12 illustrated in FIG. 20 to FIG. 23) to the communication device 5 determined at step S306 via the server-side communication unit 31 and the internet network N (step S307).

Subsequently, the user database management unit 343 records in the user database 32 the information received from the communication device 5 via the server-side communication unit 31 and the internet network N (the information transmitted at step S231E from the communication device 5 determined at step S306) (step S308). After that, the server 3 returns the process to step S301.

Specifically, when the creation operation (in the example of FIG. 21, touch on the operation icon A13) has been performed by the camera user to transmit the information related to the album name and album validity period from the communication device 5 (step S231E), the user database management unit 343 associates at step S308 the information related to the album name and album validity period with the user information recorded in the user database 32 and corresponding to the identification information for the communication device 5 determined at step S306. When the participation decision operation (in the example of FIG. 23, touch on the operation icon A16) has been performed by the camera user to transmit the information related to the album name from the communication device 5 (step S231E), the user database management unit 343 associates at step S308 the information related to the album name with the user information recorded in the user database 32 and corresponding to the identification information for the communication device 5 determined at step S306.

In addition, the third creation page W11 (refer to FIG. 22) transmitted to the communication device 5 at step S307 is created in such a manner as described below.

That is, when a participation operation (in the example of FIG. 20, touch on the operation icon A12) has been performed by the camera user and a request for transmission of the next page (the third creation page W11 illustrated in FIG. 22) has been received from the communication device 5, the server-side display controller 345 recognizes the current date and time indicated by a real-time clock (not illustrated) in the server 3. Then, the server-side display controller 345 determines the user information recorded in the user database 32 and associated with the information related to the album validity period including the recognized current date and time. Then, the server-side display controller 345 refers to the information related to the album name associated with the determined user information, and creates the third creation page W11 including the operation icons A14, A15, and the like for prompting participation in the albums "A," "B," and the like. After that, the server-side display controller 345 transmits the created third creation page W11 to the communication device 5 at step S307.

In addition, the fourth creation page W12 (refer to FIG. 23) transmitted to the communication device 5 at step S307 is created in such a manner as described below.

That is, when a participation declaration operation (in the example of FIG. 22, touch on the operation icon A14, A15, or the like) has been performed by the camera user and the information related to the album name corresponding to the touched operation icon A14 or A15 has been received from the communication device 5, the server-side display controller 345 determines the user information recorded in the user database 32 and associated with the album name. Then, the server-side display controller 345 creates the fourth creation page W12 including the handle names included in the determined user information. After that, the server-side display controller 345 transmits the created fourth creation page W12 to the communication device 5 at step S307.

When determining at step S305 that no creation access signal has been received (step S305: No), the server-side communication controller 341 then determines whether an instruction for transmission of suspension request information (e-mail) (including the identification information for the terminal of the communication device 5 as a transmission source) has been received via the server-side communication unit 31 and the Internet network N (step S309).

When determining that an instruction for transmission of suspension request information has been received (step S309: Yes), the terminal determination unit 342 determines the identification information for the communication device 5 as a transmission source having made access, according to the identification information received together with the instruction for transmission (step S310).

Subsequently, the server-side communication controller 341 refers to the information recorded in the user database 32 and transmits the suspension request information (e-mail) to communication devices 5 different from the communication device 5 determined at step S310 (step S311). After that, the server 3 returns the process to step S301.

Specifically, the server-side communication controller 341 determines the user information recorded in the user database 32 and corresponding to the identification information for the communication device 5 determined at step S310. Subsequently, the server-side communication controller 341 reads the user information recorded in the user database 32 and associated with the information related to the same album as that associated with the determined user information. Then, the server-side communication controller 341 refers to the e-mail addresses included in the read user information, and transmits the suspension request information (e-mail) to communication devices 5 different from the communication device 5 determined at step S310 (step S311). After that, the server 3 returns the process to step S301.

That is, in the embodiment, when one camera user (for example, "X" illustrated in FIG. 4) in one group of a plurality of camera users who creates a common album using the communication system 1 performs a suspension request operation (step S206B: Yes and step S226B: Yes), the suspension request (step S211: Yes) is made to the other camera users (for example, "Y" and "Z" illustrated in FIG. 4).

When determining at step S309 that no instruction for transmission of suspension request information has been received (step S309: No), the server-side communication controller 341 then determines whether captured image data (including the identification information for the terminal of the communication device 5 as a transmission source) has been received via the server-side communication unit 31 and the internet network N (step S312).

When determining that the captured image data has been received (step S312: Yes), the terminal determination unit 342 determines the identification information for the communication device 5 as a transmission source having made access, according to the identification information received together with the captured image data (step S313).

Subsequently, the user database management unit 343 associates the user information recorded in the user database 32 and related to the album name associated with the user information corresponding to the identification information for the communication device 5 determined at step S313, with the received captured image data. Then, the user database management unit 343 records in the image database 33 the captured image data and information related to the names of the albums, which are associated with one another (step S314). After that, the server 3 returns the process to step S301.

When determining at step S312 that no captured image data has been received (step S312: No), the server-side communication controller 341 then determines whether another access signal (for example, a request for viewing of an album recorded in the image database 33 or the like) has been received via the server-side communication unit 31 and the internet network N (step S315).

When determining that no other access signal has been received (step S315: No), the server 3 returns the process to step S301.

On the other hand, when determining that another access signal has been received (step S315: Yes), the terminal determination unit 342 determines the identification information for the communication device 5 as a transmission source having made access, according to the access signal (step S316).

Subsequently, the third control unit 34 executes a process according to the access signal (in the case where the access signal indicates the request for viewing, display of content (transmission of the captured image data included in the corresponding album or the like) (step S317). After that, the server 3 returns the process to step S301.

In the communication system 1 according to the embodiment described above, the communication device 5 is configured to communicate with an external device such as the imaging apparatus 4 in the first communication mode such as Wi-Fi (registered trademark) or the second communication mode such as 3G. In addition, when the communication status in the first communication mode such as Wi-Fi (registered trademark) is not favorable for communications of image data, the communication device 5 makes a request for suspension of communications in the first communication mode to other communication devices 5 (for example, communication devices 5Y and 5Z illustrated in FIG. 4) than the communication device 5 (for example, the communication device 5X illustrated in FIG. 4) in the second communication mode such as 3G.

Accordingly, even when the communication status in the first communication mode such as Wi-Fi (registered trademark) becomes unfavorable because a plurality of camera users (for example, "X," "Y," and "Z" illustrated in FIG. 4) uses their respective camera systems 2 under the same environment (for example, the wedding ceremony illustrated in FIG. 4), it is possible to use the second communication mode such as 3G relatively less prone to cause interference to make a request for suspension of communications in the first communication mode to other communication devices 5, thereby to restore the communication status in the first communication mode to favorable status for communications of image data. Therefore, communications with an external device such as the imaging apparatus 4 are advantageously enabled in the first communication mode such as Wi-Fi (registered trademark) to improve conveniences of users.

In addition, the communication device 5 according to the embodiment connects to the internet network N in the second communication mode such as 3G to access the server 3 and instruct the server 3 to transmit suspension request information (e-mail) indicative of the foregoing suspension request. That is, the communication device 5 according to the embodiment makes the foregoing suspension request via the server 3.

In this example, the server 3 manages user information (e-mail addresses and the like) of camera users (participating in creation of a specific album) in the environment (for example, the wedding ceremony illustrated in FIG. 4) under which the communication status in the first communication mode such as Wi-Fi (registered trademark) is not favorable. Accordingly, by making the foregoing suspension request (transmitting the suspension request information (e-mail)) to the server 3, it is possible to suspend the communications in the first communication mode by the camera systems 2 (for example, the camera systems 2 used by "Y" and "Z" illustrated in FIG. 4) that cause the communication status in the first communication mode such as Wi-Fi (registered trademark) to be unfavorable. That is, it is possible to restore the communication status in the first communication mode such as Wi-Fi (registered trademark) under the foregoing environment in a more reliable manner.

In addition, the communication device 5 according to the embodiment makes the foregoing suspension request when the communication status in the first communication mode such as Wi-Fi (registered trademark) is not favorable for communication of image data in uploading a captured image to the server 3 or receiving live view image data or captured image data from the imaging apparatus 4.

Accordingly, it is possible to make a suspension request at an appropriate timing without making an unnecessary suspension request.

In addition, when the communication status in the first communication mode such as Wi-Fi (registered trademark) is not favorable for communications of image data, the communication device 5 according to the embodiment causes the display unit 52 to display a communication disabled screen (for example, the communication disabled screen W5 illustrated in FIG. 12) indicating that communications in the first communication mode are disabled.

Thus, the camera user of the communication device 5 can recognize immediately that communications in the first communication mode are disabled, and can perform immediately an operation for request for suspension of communications in the first communication mode to other communication devices 5.

In addition, when receiving suspension request information (e-mail), the communication device 5 according to the embodiment causes the display unit 52 to display a suspension request screen (for example, the suspension request screen W6 illustrated in FIG. 15) for prompting suspension of communications in the first communication mode such as Wi-Fi (registered trademark).

Accordingly, the camera user of the communication device 5 can recognize immediately that suspension request information (e-mail) has been received and can perform immediately an operation for suspension of communications in the first communication mode at the communication device 5 used by himself/herself.

In addition, the imaging apparatus 4 according to the embodiment records in advance in the server 3 location information (URL) indicative of its location on the internet network N, and transmits the location information to the communication device 5 upon receipt of a request for transmission of the location information from the communication device 5.

Accordingly, when receiving the location information from the imaging apparatus 4, the communication device 5 can access the server 3 providing an album creation service and perform a member registration (registration of user information) or album creation in an easy manner.

Other Embodiments

As in the foregoing, the embodiment for carrying out the present invention is described. However, the present invention is not limited to the foregoing embodiment.

In the embodiment described above, the communication device 5 makes a request for suspension of communications in the first communication mode such as Wi-Fi (registered trademark) to the other communication devices 5 via the server 3. However, the present invention is not limited to this. For example, the communication device 5 may register in advance the e-mail addresses and the like of the camera users of the other communication devices 5 who participate in the creation of a specific album, so that the pre-registered e-mail addresses and the like can be used to make a suspension request directly to the other communication devices 5 not via the server 3.

In the foregoing embodiment, the communication system 1 is configured to include the imaging apparatus 4, the communication device 5, and the server 3. However, the present invention is not limited to this. The communication system 1 may be configured without the imaging apparatus 4. Specifically, the communication system 1 may be configured as a communication system that uses image data captured by the second imaging unit 53 of the communication device 5 to create and manage albums at the server 3.

In the foregoing embodiment, when transmitting suspension request information (e-mail), the server 3 may transmit the handle name and the like for identifying the camera user having made the suspension request together with the suspension request information. Specifically, the handle name and the like of the camera user having made the suspension request may be included in the suspension request screen (for example, the suspension request screen W6 illustrated in FIG. 15) displayed at the communication device 5 having received the suspension request information. In such a configuration, the camera user of the communication device 5 having received the suspension request information can understand who has made the suspension request. It is thus possible to make the suspension request to the camera user with security.

In the foregoing embodiment, the imaging apparatus 4 is a lens camera almost identical in entire shape to a so-called replacement lens. However, the present invention is not limited to this. The imaging apparatus 4 may be configured as a normal digital camera (regardless of the presence or absence of a display unit).

In the foregoing embodiment, the communication device 5 causes the display unit 52 to display the information indicating that communications in the first communication mode such as Wi-Fi (registered trademark) are disabled (for example, the communication disabled screen W5 illustrated in FIG. 12) and the information for prompting suspension of communications in the first communication (for example, the suspension request screen W6 illustrated in FIG. 15). However, the present invention is not limited to this. The communication device 5 may be configured to inform the information by sound.

In the foregoing embodiment, the first communication mode is set as Wi-Fi (registered trademark). However, the present invention is also applicable to network communications such as Bluetooth (registered trademark) as well as wireless LANs. In addition, the telephone line is used for the sake of simplification in the foregoing embodiment, but other wireless communications or wireless broadcasts may be used. In addition, a communication disabled state may take place due to an insufficient frequency bandwidth as well as interference. For example, the frame rate of live view images (live view image data) may become lower due to an insufficient frequency bandwidth in the case where a plurality of users uses in common a camera installed at a fixed position in a specific facility and having been incapable of communications. In such a case, the same solution can be used in a manner similar to the case of the communication disabled state in the foregoing embodiment. Although this case can also be handled by making a suspension request to other terminals, the request may be multi-casted to all the connected devices without having to send e-mail through the user registration or the server. Under this concept, it is possible to make a request to a larger number of devices by one-segment broadcasting as well as by the telephone line. The foregoing descriptions are mainly given to camera shooting scene at a wedding ceremony. However, also in situations other than camera shooting, device-to-device communications may not be favorably performed due to interference or an insufficient frequency bandwidth and thus a request for rescue may be made to other users. Especially, in recent years, information terminals and wearable devices have cooperated in wireless communications to satisfy various functions in a wider range of use. Without the need to take such a comprehensible example, the present invention is also effective in the fields of industrial equipment and medical equipment. Besides camera shooting, the present invention is also applicable to the purposes of acquiring biological information such as voices, and inspecting various subjects and recording the inspection results, and the devices for observing and inspecting the subjects.

In the foregoing embodiment, the screens W1 to W7 and the pages W8 to W12 provide various types of information in character representation. However, the present invention is not limited to this. The information may be provided in graphic representation.

In addition, the process flows are not limited to the sequences in the flowcharts described above in relation to the foregoing embodiment, but may be changed as far as no conflict occurs.

Further, the algorithms of the processes described above with reference to the flowcharts can be described as programs. Such programs may be recorded in a storage unit of a computer or in a computer-readable recording medium. The recording of the programs in the recording unit or the recording medium may be made at the time of shipment of the computer or the recording medium as products, or may be downloaded via a communication network.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication device, comprising:

a first communication unit that performs at least communications of image data with a first external device in a first communication mode;

a second communication unit that performs communications with a second external device via a network in a second communication mode different from the first communication mode;

a communication status determination unit that determines whether or not communication status in the first communication mode is favorable for communications of the image data; and a device-side communication controller that controls operations of the first communication unit and the second communication unit, wherein when the communication status determination unit determines that the communication status in the first communication mode is not favorable for communications of the image data, the device-side communication controller requests the second external device via the second communication unit to transmit information indicative of a request for turning the communication status in the first communication mode of the first external device to favorable status to at least one other communication device communicating in the first communication mode.

2. The communication device according to claim 1, wherein the first external device is an external server, the first communication unit is connectable to the server via a network in the first communication mode, and when the device-side communication controller connects to the server via the first communication unit and transmits the image data to the server, in the case where the communication status determination unit determines that the communication status in the first communication mode is not favorable for communications of image data, the device-side communication controller performs communications with the second external device via the second communication unit on the request for suspension of communications performed by other communication devices in the first communication mode.

3. The communication device according to claim 1, wherein the first external device is an external imaging apparatus, and when the device-side communication controller receives from the imaging apparatus the image data generated by the imaging apparatus via the first communication unit, in the case where the communication status determination unit determines that the communication status in the first communication mode is not favorable for communications of the image data, the device-side communication controller performs communications with the second external device via the second communication unit on the request for suspension of communications performed by other communication devices in the first communication mode.

4. The communication device according to claim 1, further comprising a notification unit that, when the communication status determination unit determines that the communication status in the first communication mode is not favorable for communications of the image data, notifies information indicating that the communication status in the first communication mode is not favorable.

5. The communication device according to claim 1, further comprising a notification unit that, when the device-side communication controller receives the request for suspension of communications in the first communication mode from the second external device via the first communication unit or the second communication unit, notifies information for prompting suspension of communications in the first communication mode.

6. The communication device according to claim 1, wherein the first communication mode is a communication mode using a wireless LAN, and the second communication mode is a communication mode using a telephone line.

7. An imaging system, comprising:

a communication device communicable in two communication modes; and an imaging apparatus performing communications in a first communication mode of the two communication modes, wherein the communication device is connectable to an external server via a network in a second communication mode different from the first communication mode of the two communication modes, and when communication status in the first communication mode is not favorable for communications of image data, the communication device connects to the external server in the second communication mode and performs communications with the external server on a request for suspension of communications performed by other communication devices in the first communication mode, and the imaging apparatus includes an imaging unit that captures a subject to generate image data, an imaging-side recording unit that records location information indicative of a location of the external server on the network, an imaging-side communication unit that connects to the communication device to transmit and receive information to and from the communication device in the first communication mode, and an imaging-side communication controller that transmits the image data and the location information to the communication device via the imaging-side communication unit.

8. A server configured to communicate with a plurality of communication devices via a network, comprising:

a server-side communication unit that connects to the plurality of communication devices via the network to transmit and receive information to and from the plurality of communication devices;

a server-side recording unit that records each of address information indicative of an address at which information is transmitted to each of the plurality of communication device, each of the address information being set for each of the plurality of communication devices; and a server-side communication controller that receives from one of the plurality of communication devices, which is communicating in a first communication mode, via the server-side communication unit, a request for suspension of communications performed by the other communication devices except for the one communication device in the first communication mode, wherein when the server-side communication controller receives the request for suspension, the server-side communication controller transmits suspension request information to at least one of the other communication devices with the address information recorded in the server-side recording unit.

* * * * *